United States Patent
Xie et al.

(10) Patent No.: US 11,855,888 B2
(45) Date of Patent: Dec. 26, 2023

(54) PACKET VERIFICATION METHOD, DEVICE, AND SYSTEM

(71) Applicant: HUAWEI TECHNOLOGIES CO., LTD., Guangdong (CN)

(72) Inventors: Jingrong Xie, Beijing (CN); Yang Xia, Beijing (CN); Xuesong Geng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/045,175

(22) Filed: Oct. 10, 2022

(65) Prior Publication Data

US 2023/0115034 A1 Apr. 13, 2023

Related U.S. Application Data

(63) Continuation of application No. PCT/CN2021/081471, filed on Mar. 18, 2021.

(30) Foreign Application Priority Data

Apr. 13, 2020 (CN) .......................... 202010287068.8

(51) Int. Cl.
*H04L 45/00* (2022.01)
*H04L 9/08* (2006.01)
(Continued)

(52) U.S. Cl.
CPC .......... *H04L 45/566* (2013.01); *H04L 9/0825* (2013.01); *H04L 9/3242* (2013.01); *H04L 45/741* (2013.01)

(58) Field of Classification Search
None
See application file for complete search history.

(56) References Cited

U.S. PATENT DOCUMENTS

| 9,590,973 B2 | 3/2017 | Treleaven et al. |
| 2014/0122865 A1 | 5/2014 | Ovsiannikov |

(Continued)

FOREIGN PATENT DOCUMENTS

| CN | 1477814 A | 2/2004 |
| CN | 104811387 A | 7/2015 |

(Continued)

OTHER PUBLICATIONS

J. Xie et al., Encapsulation for BIER in Non-MPLS IPv6, Networks draft-xie-bier-ipv6-encapsulation-06, Network Working Group, Internet-Draft, Mar. 9, 2020, 35 pages.

(Continued)

*Primary Examiner* — Angela Nguyen
(74) *Attorney, Agent, or Firm* — HUAWEI TECHNOLOGIES CO., LTD.

(57) ABSTRACT

This application provides a packet verification method, and the method includes: A first network device receives a BIER packet, where packet header information of the BIER packet includes a first keyed-hash message authentication code HMAC, and the first HMAC is used to verify whether the BIER packet is a valid BIER packet; determines a second HMAC based on a first key and first information in the packet header information, where the first information is used to indicate forwarding information of the BIER packet; determines whether the first HMAC is the same as the second HMAC; and when determining that the first HMAC is different from the second HMAC, determines that the BIER packet is an invalid BIER packet.

30 Claims, 11 Drawing Sheets

(51) Int. Cl.
*H04L 9/32* (2006.01)
*H04L 45/741* (2022.01)

(56) References Cited

U.S. PATENT DOCUMENTS

| | | | |
|---|---|---|---|
| 2015/0131658 A1 | 5/2015 | Wijnands et al. | |
| 2019/0387405 A1* | 12/2019 | Christiansen | G01D 4/004 |
| 2021/0078534 A1* | 3/2021 | Stitt | H04W 4/40 |
| 2021/0377029 A1* | 12/2021 | Sloane | H04L 9/0643 |

FOREIGN PATENT DOCUMENTS

| | | |
|---|---|---|
| CN | 105743863 A | 7/2016 |
| CN | 106656524 A | 5/2017 |
| CN | 107147508 A | 9/2017 |
| CN | 109921987 A | 6/2019 |
| CN | 110784411 A | 2/2020 |
| WO | 2016198016 A2 | 12/2016 |
| WO | 2019114437 A1 | 6/2019 |

OTHER PUBLICATIONS

Request for Comments: 8279, IJ. Wijnands, Ed et al., Multicast Using Bit Index Explicit Replication (BIER), Internet Engineering Task Force (IETF), Nov. 2017, 43 pages.
Request for Comments: 8296, IJ. Wijnands, Ed et al., Encapsulation for Bit Index Explicit Replication (BIER) in MPLS and Non-MPLS Networks, Internet Engineering Task Force (IETF), Jan. 2018, 24 pages.

* cited by examiner

PACKET VERIFICATION METHOD, DEVICE, AND SYSTEM

CROSS-REFERENCE TO RELATED APPLICATIONS

This application is a continuation of International Application No. PCT/CN2021/081471, filed on Mar. 18, 2021, which claims priority to Chinese Patent Application No. 202010287068.8, filed on Apr. 13, 2020. The disclosures of the aforementioned applications are hereby incorporated by reference in their entireties.

TECHNICAL FIELD

This application relates to the network communications field, and more specifically, to a packet verification method, device, and system.

BACKGROUND

Internet protocol (IP) multicast technologies implement efficient point-to-multipoint data transfer in IP networks, and can effectively save network bandwidth and reduce network load. Therefore, a new technology used for constructing a multicast data forwarding path is proposed in the industry. The technology is referred to as a bit index explicit replication (BIER) technology. The technology proposes a new multicast technical architecture in which a multicast distribution tree does not need to be constructed.

In a related technical solution, there is a lack of some security mechanisms for BIER packets, and consequently, invalid BIER packets are replicated in large quantities in a BIER domain, and sent to a device that does not need to receive such multicast traffic. This causes a waste of link bandwidth, and even causes denial of service (DoS) on a link.

SUMMARY

This application provides a packet verification method, a first network device, a second network device, and a packet verification system, so as to detect an invalid BIER packet, and enhance security in a BIER packet forwarding process or accuracy of BIER packet encapsulation.

According to a first aspect, a packet verification method is provided, including: A first network device receives a bit index explicit replication BIER packet, where packet header information of the BIER packet includes a first keyed-hash message authentication code HMAC, and the first HMAC is used to verify whether the BIER packet is a valid BIER packet; the first network device determines a second HMAC based on a first key and first information in the packet header information, where the first information is used to indicate forwarding information of the BIER packet; the first network device determines whether the first HMAC is the same as the second HMAC; and when the first network device determines that the first HMAC is different from the second HMAC, the first network device determines that the BIER packet is an invalid BIER packet.

It should be understood that the first HMAC is determined by an ingress node (for example, a BFIR1 or BFIR2 shown in FIG. 1) based on the configured first key and the first information in the packet header information when encapsulating the packet header information of the BIER packet, and is carried in the packet header information of the BIER packet forwarded to another node. A location in the packet header information for carrying the first HMAC is not specifically limited in this application.

It should be noted that, in this embodiment of this application, when the ingress node (for example, the BFIR1 or BFIR2 shown in FIG. 1) calculates the first HMAC, the first key used in the calculation may be manually configured by an administrator, or may be centrally delivered and configured by a network management device. This is not specifically limited in this application.

It should be further noted that the first information used by the ingress node to calculate the first HMAC may be a field that is in the packet header information and that is used to guide forwarding of the BIER packet, and the field used to guide forwarding of the BIER packet does not need to be changed during forwarding of the BIER packet.

After receiving the BIER packet, the first network device may determine the second HMAC based on the first key locally configured on the first network device and the first information in the packet header information of the BIER packet. It should be understood that, similarly to that for the ingress node, the first key used by the first network device to calculate the second HMAC may be manually configured by the administrator, or may be centrally delivered and configured by the network management device, or may be delivered by the ingress node to the first network device. This is not specifically limited in this application.

The first information used by the first network device to calculate the second HMAC should be the same as the first information used by the ingress node to calculate the first HMAC. There may be a plurality of specific implementations. This is not specifically limited in this application. For example, the ingress node and the first network device may configure and use the same first information according to a network protocol. Specifically, the network protocol uniformly specifies the first information used in HMAC calculation. In this way, the first information used by the first network device to calculate the second HMAC can be the same as the first information used by the ingress node to calculate the first HMAC. For another example, alternatively, the ingress node may deliver, to the first network device, the first information used by the ingress node to calculate the first HMAC. In this way, the first information used by the first network device to calculate the second HMAC can be the same as the first information used by the ingress node to calculate the first HMAC. For another example, alternatively, the ingress node may add indication information to the packet header information of the BIER packet, where the indication information may indicate the first information used by the ingress node to calculate the first HMAC. In this way, the first information used by the first network device to calculate the second HMAC can be the same as the first information used by the ingress node to calculate the first HMAC.

In this embodiment of this application, the first information used by the ingress node to calculate the first HMAC may be the field that is in the packet header information and that is used to guide forwarding of the BIER packet, and the field used to guide forwarding of the BIER packet does not need to be changed during forwarding of the BIER packet. Therefore, after receiving the BIER packet, another forwarding device (for example, the first network device) in a BIER domain may calculate the second HMAC based on the first key and the first information that are the same as those used by the ingress node to calculate the first HMAC, and compare whether the second HMAC is the same as the first HMAC.

If the second HMAC calculated by the first network device is the same as the first HMAC carried in the packet header information of the BIER packet, it may be understood as that the BIER packet is a valid packet. For example, the first information in the packet header information is not maliciously tampered during forwarding of the BIER packet.

If the second HMAC calculated by the first network device is different from the first HMAC carried in the packet header information of the BIER packet, it may be understood as that the BIER packet is an invalid packet. For example, the first information in the packet header information is maliciously tampered during forwarding of the BIER packet.

In the foregoing technical solution, after receiving the BIER packet, the first network device may determine the second HMAC based on the configured key and the first information in the packet header information, and compare whether the first HMAC carried in the BIER packet is the same as the second HMAC. If the first HMAC is the same as the second HMAC, it indicates that the BIER packet is not subjected to unauthorized modification, and the BIER packet may be considered as a valid packet. Otherwise, the BIER packet may be considered as an invalid packet. In this way, it can be detected whether the BIER packet is an invalid packet, or a probability of detecting whether the BIER packet is an invalid packet can be increased. Security in a BIER packet forwarding process can be enhanced. In addition, an error or a mistake in encapsulating the packet header information of the BIER packet by the ingress node in the BIER domain can be avoided, thereby improving accuracy of BIER packet encapsulation.

Further, in the foregoing technical solution, an unauthorized device can also be locked out by identifying an invalid BIER packet, or it can be determined whether a network device that forwards and processes the BIER packet is faulty.

In a possible implementation, the method further includes: When the first network device determines that the first HMAC is the same as the second HMAC, the first network device determines that the BIER packet is a valid BIER packet; and the first network device forwards the BIER packet.

In another possible implementation, the first information includes at least one of the following: a sub-domain SD, a bit string length BSL, and a set identifier SI.

In another possible implementation, the first information includes a bit index forwarding table identifier BIFT-ID.

In another possible implementation, the first network device determines, based on the BIFT-ID, an SD, a BSL, and an SI that correspond to the BIER packet; and the first network device determines the second HMAC based on the first key and at least one of the following: the SD, the BSL, and the SI.

In another possible implementation, the first information further includes a BIER forwarding ingress router identifier BFIR-ID.

In another possible implementation, the packet header information of the BIER packet includes an internet protocol version 6 IPv6 header, and the first information further includes a source IPv6 address field.

In another possible implementation, the packet header information of the BIER packet further includes an HMAC flag field, and a flag bit in the HMAC flag field indicates the first information used in calculation of the second HMAC.

In another possible implementation, the packet header information of the BIER packet further includes an identifier ID of the first key.

In the foregoing technical solution, the first network device may be allowed to store a plurality of keys, and identifiers of the keys are used for distinguishment. One of the keys is used for HMAC calculation. In this case, when one key is used for a comparatively long time, the key may be replaced, and another key in the plurality of keys may be used, so as to increase a probability of detecting whether a BIER packet is an invalid packet.

In another possible implementation, the packet header information of the BIER packet further includes an HMAC key field, and the HMAC key field includes the identifier ID of the first key.

In another possible implementation, the packet header information of the BIER packet further includes an identifier ID of an algorithm, and the algorithm is an algorithm for indicating the first network device to determine the second HMAC.

According to a second aspect, a packet verification method is provided, including: A second network device receives a multicast data packet; the second network device encapsulates the multicast data packet to obtain a bit index explicit replication BIER packet, where the BIER packet carries a first keyed-hash message authentication code HMAC, the first HMAC is determined by the second network device based on a first key and first information in packet header information of the BIER packet, the first information is used to indicate forwarding information of the BIER packet, and the first HMAC is used to verify whether the BIER packet is a valid BIER packet; and the second network device forwards the BIER packet.

In a possible implementation, the first information includes at least one of the following: a sub-domain SD, a bit string length BSL, and a set identifier SI.

In another possible implementation, the first information includes a bit index forwarding table identifier BIFT-ID.

In another possible implementation, the second network device determines, based on the BIFT-ID, an SD, a BSL, and an SI that correspond to the BIER packet; and the second network device determines the first HMAC based on the first key and at least one of the following: the SD, the BSL, and the SI.

In another possible implementation, the first information further includes a BIER forwarding ingress router identifier BFIR ID.

In another possible implementation, the packet header information of the BIER packet includes an internet protocol version 6 IPv6 header, and the first information further includes a source IPv6 address field.

In another possible implementation, the packet header information of the BIER packet further includes an HMAC flag field, and a flag bit in the HMAC flag field indicates the first information used in calculation of the first HMAC.

In another possible implementation, the packet header information of the BIER packet further includes an identifier ID of the first key.

In another possible implementation, the packet header information of the BIER packet further includes an HMAC key field, and the HMAC key field includes the identifier ID of the first key.

In another possible implementation, the packet header information of the BIER packet further includes an ID of an algorithm, and the algorithm is an algorithm for indicating the second network device to determine the first HMAC.

Beneficial effects of any one of the second aspect or the possible implementations of the second aspect correspond to beneficial effects of any one of the first aspect or the possible implementations of the first aspect. For this, details are not described again.

According to a third aspect, a first network device is provided, including:
- a receiving module, configured to receive a bit index explicit replication BIER packet, where packet header information of the BIER packet includes a first keyed-hash message authentication code HMAC, and the first HMAC is used to verify whether the BIER packet is a valid BIER packet; and
- a determining module, configured to determine a second HMAC based on a first key and first information in the packet header information, where the first information is used to indicate forwarding information of the BIER packet.

The determining module is further configured to determine whether the first HMAC is the same as the second HMAC.

The determining module is further configured to: when determining that the first HMAC is different from the second HMAC, determine that the BIER packet is an invalid BIER packet.

In a possible implementation, the determining module is further configured to: when determining that the first HMAC is the same as the second HMAC, determine that the BIER packet is a valid BIER packet.

The first network device further includes: a forwarding module, configured to forward the BIER packet.

In another possible implementation, the first information includes at least one of the following: a sub-domain SD, a bit string length BSL, and a set identifier SI.

In another possible implementation, the first information includes a bit index forwarding table identifier BIFT-ID.

In another possible implementation, the determining module is specifically configured to: determine, based on the BIFT-ID, an SD, a BSL, and an SI that correspond to the BIER packet; and determine the second HMAC based on the first key and at least one of the following: the SD, the BSL, and the SI.

In another possible implementation, the first information further includes a BIER forwarding ingress router identifier BFIR-ID.

In another possible implementation, the packet header information of the BIER packet includes an internet protocol version 6 IPv6 header, and the first information further includes a source IPv6 address field.

In another possible implementation, the packet header information of the BIER packet further includes an HMAC flag field, and a flag bit in the HMAC flag field indicates the first information used in calculation of the second HMAC.

In another possible implementation, the packet header information of the BIER packet further includes an identifier ID of the first key.

In another possible implementation, the packet header information of the BIER packet further includes an HMAC key field, and the HMAC key field includes the identifier ID of the first key.

In another possible implementation, the packet header information of the BIER packet further includes an identifier ID of an algorithm, and the algorithm is an algorithm for indicating the first network device to determine the second HMAC.

According to a fourth aspect, a second network device is provided, including:
- a receiving module, configured to receive a multicast data packet;
- an encapsulation module, configured to encapsulate the multicast data packet to obtain a bit index explicit replication BIER packet, where the BIER packet carries a first keyed-hash message authentication code HMAC, the first HMAC is determined by the second network device based on a first key and first information in packet header information of the BIER packet, the first information is used to indicate forwarding information of the BIER packet, and the first HMAC is used to verify whether the BIER packet is a valid BIER packet; and
- a forwarding module, configured to forward the BIER packet.

In another possible implementation, the first information includes at least one of the following: a sub-domain SD, a bit string length BSL, and a set identifier SI.

In another possible implementation, the first information includes a bit index forwarding table identifier BIFT-ID.

In another possible implementation, the encapsulation module is specifically configured to: determine, based on the BIFT-ID, an SD, a BSL, and an SI that correspond to the BIER packet; and determine the first HMAC based on the first key and at least one of the following: the SD, the BSL, and the SI.

In another possible implementation, the first information further includes a BIER forwarding ingress router identifier BFIR ID.

In another possible implementation, the packet header information of the BIER packet includes an internet protocol version 6 IPv6 header, and the first information further includes a source IPv6 address field.

In another possible implementation, the packet header information of the BIER packet further includes an HMAC flag field, and a flag bit in the HMAC flag field indicates the first information used in calculation of the first HMAC.

In another possible implementation, the packet header information of the BIER packet further includes an identifier ID of the first key.

In another possible implementation, the packet header information of the BIER packet further includes an HMAC key field, and the HMAC key field includes the identifier ID of the first key.

In another possible implementation, the packet header information of the BIER packet further includes an ID of an algorithm, and the algorithm is an algorithm for indicating the second network device to determine the first HMAC.

According to a fifth aspect, a first network device is provided, and the first network device has a function of implementing behaviors of the first network device in the foregoing method. The function may be implemented based on hardware, or may be implemented based on hardware executing corresponding software. The hardware or the software includes one or more modules corresponding to the foregoing functions.

In a possible design, a structure of the first network device includes a processor and an interface. The processor is configured to support the first network device in performing a corresponding function in the foregoing method. The interface is configured to support the first network device in receiving a BIER packet, or is configured to support forwarding the BIER packet. The first network device may further include a memory. The memory is configured to be coupled to the processor. The memory stores program instructions and data that are necessary for the first network device.

In another possible design, the first network device includes a processor, a transmitter, a receiver, a random access memory, a read-only memory, and a bus. The processor is coupled to each of the transmitter, the receiver, the random access memory, and the read-only memory by using the bus. When the first network device needs to be run, a system is booted by using a basic input/output system fixed in the read-only memory or a bootloader in an embedded system, so as to boot the first network device to enter a normal running state. After the first network device enters the normal running state, an application program and an operating system are run in the random access memory, so that the processor performs the method in any one of the first aspect or the possible implementations of the first aspect.

According to a sixth aspect, a first network device is provided. The first network device includes a main control board and an interface board, and may further include a switching board. The first network device is configured to perform the method in any one of the first aspect or the possible implementations of the first aspect. Specifically, the first network device includes modules configured to perform the method in any one of the first aspect or the possible implementations of the first aspect.

According to a seventh aspect, a first network device is provided. The first network device includes a controller and a first forwarding sub-device. The first forwarding sub-device includes an interface board, and may further include a switching board. The first forwarding sub-device is configured to perform a function of the interface board in the sixth aspect, and may further perform a function of the switching board in the sixth aspect. The controller includes a receiver, a processor, a transmitter, a random access memory, a read-only memory, and a bus. The processor is coupled to each of the receiver, the transmitter, the random access memory, and the read-only memory by using the bus. When the controller needs to be run, a system is booted by using a basic input/output system fixed in the read-only memory or a bootloader in an embedded system, so as to boot the controller to enter a normal running state. After the controller enters the normal running state, an application program and an operating system are run in the random access memory, so that the processor performs a function of the main control board in the sixth aspect.

It can be understood that, in actual application, the first network device may include any quantity of interfaces, processors, or memories.

According to an eighth aspect, a second network device is provided, and the second network device has a function of implementing behaviors of the second network device in the foregoing method. The function may be implemented based on hardware, or may be implemented based on hardware executing corresponding software. The hardware or the software includes one or more modules corresponding to the foregoing functions.

In a possible design, a structure of the second network device includes a processor and an interface. The processor is configured to support the second network device in performing a corresponding function in the foregoing method. The interface is configured to support the second network device in receiving a multicast data packet, or is configured to support the second network device in forwarding a BIER packet. The second network device may further include a memory.

The memory is configured to be coupled to the processor. The memory stores program instructions and data that are necessary for the second network device.

In another possible design, the second network device includes a processor, a transmitter, a receiver, a random access memory, a read-only memory, and a bus. The processor is coupled to each of the transmitter, the receiver, the random access memory, and the read-only memory by using the bus. When the second network device needs to be run, a system is booted by using a basic input/output system fixed in the read-only memory or a bootloader in an embedded system, so as to boot the second network device to enter a normal running state. After the second network device enters the normal running state, an application program and an operating system are run in the random access memory, so that the processor performs the method in any one of the second aspect or the possible implementations of the second aspect.

According to a ninth aspect, a second network device is provided. The second network device includes a main control board and an interface board, and may further include a switching board. The second network device is configured to perform the method in any one of the second aspect or the possible implementations of the second aspect. Specifically, the second network device includes modules configured to perform the method in any one of the second aspect or the possible implementations of the second aspect.

According to a tenth aspect, a second network device is provided. The second network device includes a controller and a first forwarding sub-device. The first forwarding sub-device includes an interface board, and may further include a switching board. The first forwarding sub-device is configured to perform a function of the interface board in the ninth aspect, and may further perform a function of the switching board in the ninth aspect. The controller includes a receiver, a processor, a transmitter, a random access memory, a read-only memory, and a bus. The processor is coupled to each of the receiver, the transmitter, the random access memory, and the read-only memory by using the bus. When the controller needs to be run, a system is booted by using a basic input/output system fixed in the read-only memory or a bootloader in an embedded system, so as to boot the controller to enter a normal running state. After the controller enters the normal running state, an application program and an operating system are run in the random access memory, so that the processor performs a function of the main control board in the ninth aspect.

It can be understood that, in actual application, the second network device may include any quantity of interfaces, processors, or memories.

According to an eleventh aspect, a computer program product is provided. The computer program product includes computer program code. When the computer program code is run on a computer, the computer is enabled to perform the method in any one of the first aspect or the possible implementations of the first aspect.

According to a twelfth aspect, a computer program product is provided. The computer program product includes computer program code. When the computer program code is run on a computer, the computer is enabled to perform the method in any one of the second aspect or the possible implementations of the second aspect.

According to a thirteenth aspect, a computer-readable medium is provided. The computer-readable medium stores program code. When the computer program code is run on a computer, the computer is enabled to perform the method in any one of the first aspect or the possible implementations of the first aspect. These computer-readable storages include but are not limited to one or more of the following: a read-only memory (ROM), a programmable ROM (PROM), an erasable PROM (EPROM), a flash memory, an electrically EPROM (EEPROM), and a hard drive.

According to a fourteenth aspect, a computer-readable medium is provided. The computer-readable medium stores program code. When the computer program code is run on a computer, the computer is enabled to perform the method in any one of the second aspect or the possible implementations of the second aspect. These computer-readable storages include but are not limited to one or more of the following: a read-only memory (ROM), a programmable ROM (PROM), an erasable PROM (EPROM), a flash memory, an electrically EPROM (EEPROM), and a hard drive.

According to a fifteenth aspect, a chip is provided. The chip includes a processor and a data interface. The processor reads, by using the data interface, instructions stored in a memory, to perform the method in any one of the first aspect or the possible implementations of the first aspect. In a specific implementation process, the chip may be implemented in a form of a central processing unit (CPU), a microcontroller (micro controller unit, MCU), a microprocessor (micro processing unit, MPU), a digital signal processor (DSP), a system on a chip (SoC), an application-specific integrated circuit (ASIC), a field programmable gate array (FPGA), or a programmable logic device (PLD).

According to a sixteenth aspect, a chip is provided. The chip includes a processor and a data interface. The processor reads, by using the data interface, instructions stored in a memory, to perform the method in any one of the second aspect or the possible implementations of the second aspect. In a specific implementation process, the chip may be implemented in a form of a central processing unit (CPU), a microcontroller (micro controller unit, MCU), a microprocessor (micro processing unit, MPU), a digital signal processor (DSP), a system on a chip (SoC), an application-specific integrated circuit (ASIC), a field programmable gate array (FPGA), or a programmable logic device (PLD).

According to a seventeenth aspect, a system is provided. The system includes the first network device and the second network device that are described above.

DESCRIPTION OF EMBODIMENTS

Figure 1:
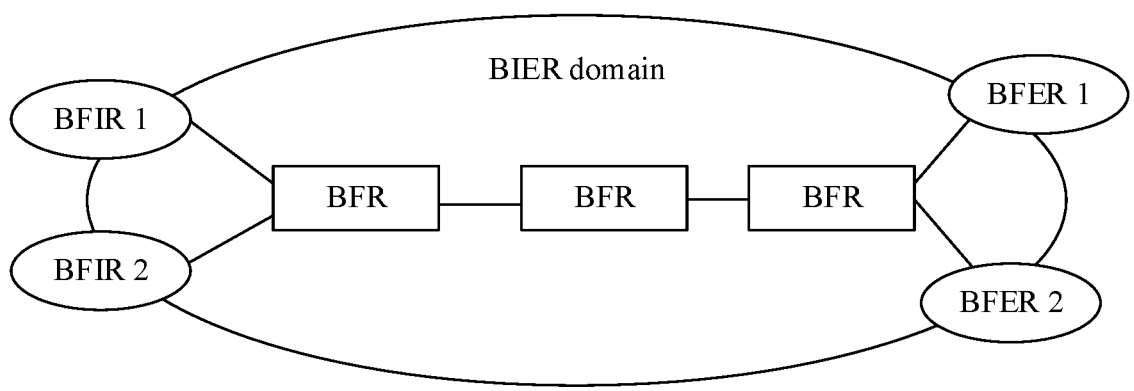
FIG. 1 is a schematic networking diagram of a BIER technology according to an embodiment of this application.

The following describes technical solutions of this application with reference to the accompanying drawings.

All aspects, embodiments, or features are presented in this application by describing a system including a plurality of devices, components, modules, and the like. It should be understood and appreciated that each system may include another device, component, module, and the like, and/or may not include all devices, components, modules, and the like discussed with reference to the accompanying drawings. In addition, a combination of these solutions may be used.

In addition, words such as "example" and "for example" in embodiments of this application are used to represent giving an example, an illustration, or a description. Any embodiment or design solution described as an "example" in this application should not be explained as being more preferred or having more advantages than another embodiment or design solution. Exactly, use of the word "example" is intended to present a concept in a specific manner.

In embodiments of this application, "corresponding (corresponding or relevant)" and "corresponding" sometimes may be interchangeably used. It should be noted that, when a difference between the two words is not emphasized, the two words are intended to express a same meaning.

A network architecture and a service scenario described in embodiments of this application are intended to describe the technical solutions in embodiments of this application more clearly, and do not constitute any limitation on the technical solutions provided in embodiments of this application. A person of ordinary skill in the art may learn that, with evolution of the network architecture and emergence of a new service scenario, the technical solutions provided in embodiments of this application are also applicable to similar technical problems.

Referring to "an embodiment" or "some embodiments" or the like described in this specification means that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment, but mean "one or more but not all of embodiments", unless otherwise specifically emphasized in another manner. Terms "include", "have", and variants thereof all mean "include but are not limited to", unless otherwise specifically emphasized in another manner.

In this application, "at least one" means one or more, and "a plurality of" means two or more. In addition, "and/or"

describes an association relationship between associated objects, and represents that three relationships may exist. For example, A and/or B may represent the following cases: Only A exists, both A and B exist, and only B exists, where A and B may be singular or plural. A character "/" usually indicates an "or" relationship between associated objects. In addition, "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Multicast is a data transmission manner for sending data to a plurality of receivers on a transmission control protocol (TCP)/internet protocol (IP) network at the same time in an efficient manner by using one multicast address. A multicast source sends a multicast stream to a multicast group member in a multicast group by using a link in the network, and all multicast group members in the multicast group can receive the multicast stream. The multicast transmission manner implements a point-to-multipoint data connection between the multicast source and the multicast group members. A multicast stream needs to be transferred only once on each network link, and the multicast stream is replicated only when a branch is present on the link. Therefore, the multicast transmission manner improves data transmission efficiency and reduces a possibility of congestion in a backbone network.

Internet protocol (IP) multicast technologies implement efficient point-to-multipoint data transfer in IP networks, and can effectively save network bandwidth and reduce network load. Therefore, the IP multicast technologies are widely applied to many fields such as real-time data transfer, multimedia conferencing, data copying, interactive personality TV (internet protocol television, IPTV), games, and simulation. In the multicast technology, a control plane multicast tree is constructed by using a multicast protocol, and then, a network plane is formed into a logical tree by using the multicast tree, to implement multicast point-to-multipoint data forwarding. All such intermediate nodes centered on constructing distribution trees need to maintain complex multicast forwarding information states. As a network scale is becoming larger and multicast data traffic is increasing, such a multicast technology requires increasingly high costs, and faces challenges in operation and maintenance.

Therefore, a new technology used for constructing a multicast data forwarding path is proposed in the industry. The technology is referred to as a bit index explicit replication (BIER) technology. The technology proposes a multicast technical architecture in which a multicast distribution tree does not need to be constructed. As shown in FIG. 1, a router supporting a BIER technology is referred to as a bit-forwarding router (BFR), and the BFR may receive and forward a BIER packet. A multicast forwarding domain that includes one or more BFRs is referred to as a BIER domain. At an ingress of the BIER domain, a BFR that performs BIER encapsulation on an original multicast data packet is referred to as a bit forwarding ingress router (BFIR). At an egress of the BIER domain, a BFR that decapsulates a BIER packet to obtain the original multicast data packet is referred to as a bit forwarding egress router (BFER). It should be understood that the BFIR and the BFER in the BIER domain may be referred to as edge BFRs in the BIER domain.

For ease of understanding, the following describes related technologies of BIER in detail with reference to FIG. 2 to FIG. 5.

In the BIER domain, a bit position identifier globally unique in an entire BIER sub-domain (SD) may be configured for the foregoing edge BFR. In an example, one value is configured for each edge BFR as a BFR identifier (BFR ID). For example, the BFR ID may be a value between 1 and 256. All BFR IDs in the BIER domain constitute one bit string.

In embodiments of this application, when the original multicast data packet needs to be transmitted in the BIER domain, the original multicast data packet needs to be additionally encapsulated with a specific BIER header. In the BIER header, all destination nodes of the original multicast data packet are indicated by using a bit string. A BFR in the BIER domain may perform forwarding based on a bit index forwarding table (BIFT) and the bit string carried in the BIER header, to ensure that the original multicast data packet can be sent to all destination addresses.

It should be noted that the destination nodes of the original multicast data packet in this application may be a set of a plurality of BFERs. For ease of description, a set of a plurality of BFERs to which an original multicast data packet needs to be sent is referred to as destination nodes below.

It should be understood that an original multicast data packet following a BIER header may be an internet protocol version 6 (IPv6) multicast packet, or may be an internet protocol version 4 (IPv4) multicast packet. This is not specifically limited in this application.

There may be a plurality of types of BIER encapsulation. This is not specifically limited in this application. In an example, a BIER packet may be encapsulated by using multiprotocol label switching (MPLS), and such encapsulation may be referred to as BIER-MPLS encapsulation. In another example, a BIER packet may be encapsulated based on internet protocol version 6 (IPv6), and such encapsulation may be referred to as BIERv6 encapsulation.

Figure 2:
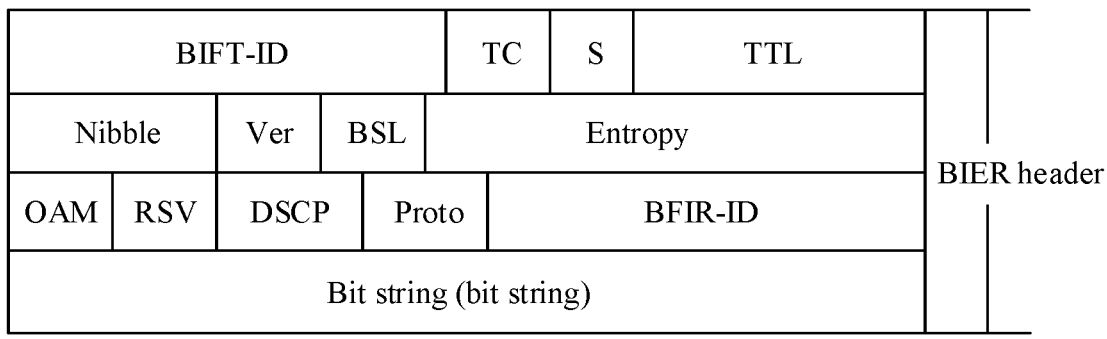
FIG. 2 is a schematic diagram of a possible BIER header format according to an embodiment of this application.
Figure 3:
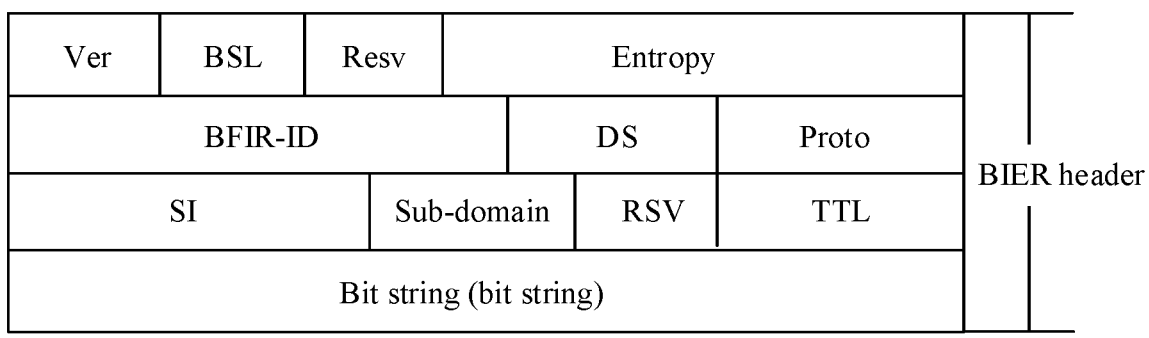
FIG. 3 is a schematic block diagram of another possible BIER header format.
Figure 4:
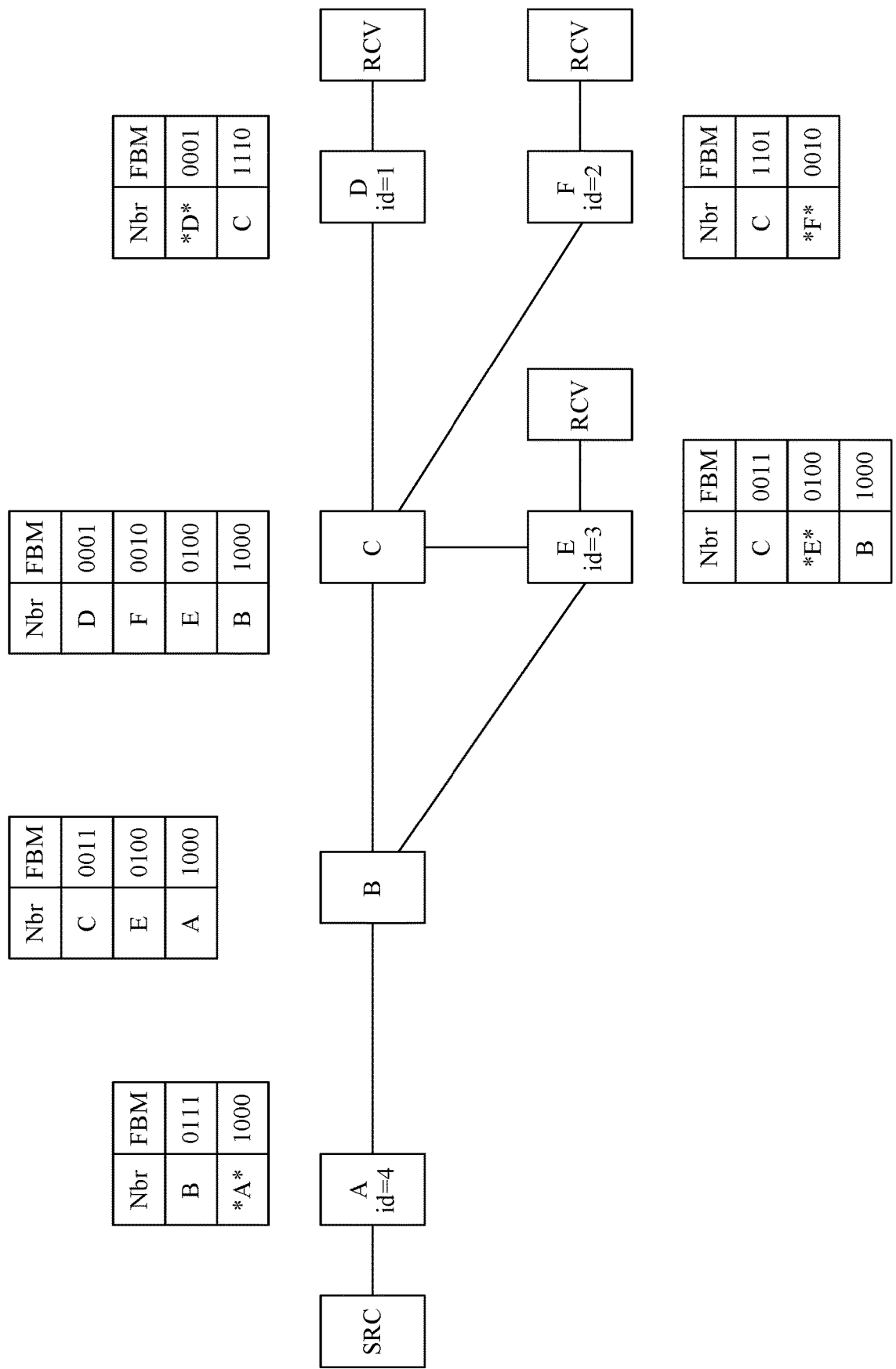
FIG. 4 shows a process of establishing a BIER forwarding table and forwarding a BIER packet based on a BIER technology.

The following describes in detail a related technology of BIER-MPLS encapsulation with reference to FIG. 2 to FIG. 4.

In embodiments of this application, a BIER header format is not specifically limited, provided that a BIER header includes a bit string field. The following describes in detail two possible BIER header formats respectively with reference to FIG. 2 and FIG. 3.

FIG. 2 is a schematic block diagram of a possible BIER header format. As shown in FIG. 2, a BIER header may include but is not limited to: a bit index forwarding table identifier (BIFT ID) whose length is 20 bits, a bit string length (BSL), and other fields of 64 bits (eight bytes), for example, a traffic class (TC) of an original multicast data packet following the BIER header, a stack (S), a time to live (TTL) field, an entropy field, a version (Ver), and a proto field.

The fields in the BIER header are separately described in detail below.

(1) BIFT ID Field

This field is 20 bits long, and is an MPLS label (L) in BIER-multiprotocol label switching (MPLS) encapsulation. The MPLS label may be referred to as a BIER label, and fields such as the TC, S, and TTL following the MPLS label are in standard label encoding formats. The fields such as the TC, S, and TTL are separately described below, and details are not described herein.

The BIFT ID may be referred to as a BIFT-ID, and may include a combination of a sub-domain (SD), a bit string length (BSL), and a set identifier (SI). Different BIFT IDs may correspond to different SD/BSL/SI combinations.

It should be understood that different BIFT IDs may be mapped to different SD/BSL/SI combinations. The BIER header format shown in FIG. 2 does not directly include SD, BSL, and SI fields. The SD, BSL, and SI fields are three implicit fields. SD, BSL, and SI values need to be obtained through mapping based on the BIFT ID field.

1. Sub-Domain (SD)

A BIER domain may be divided into and configured as different sub-domains SDs based on a requirement of an actual service scenario, to support characteristics such as multi-topology of an interior gateway protocol (IGP). Each BIER domain needs to include at least one sub-domain, namely, a default sub-domain 0. When a BIER domain is divided into a plurality of sub-domains, all the sub-domains need to be configured for each BFR in the BIER domain. For example, on each BFR in the BIER domain, a sub-domain 0 may be configured, for which a system default topology is used, and then a sub-domain 1 is configured, for which a multicast topology is used.

Each sub-domain SD is represented by a sub-domain identifier (SD-ID). For example, a value of the SD-ID is in an interval [0-255], and is eight bits long. In an example, a BIER domain may be configured as different SDs based on different virtual private networks (VPN), and different VPNs are configured to use different SDs. For example, a VPN 1 uses an SD 0, and a VPN 2 uses an SD 1.

It should be noted that a plurality of VPNs may alternatively use a same SD, and different SDs in a BIER domain may be in one interior gateway protocol (IGP) process or topology, or may be in different IGP processes or topologies. This is not specifically limited in this embodiment of this application.

2. Bit String Length (BSL)

The BSL is a length of a bit string included in the BIER header. There may be a plurality of types of BSLs. This is not specifically limited in this embodiment of this application. A minimum BSL is 64 bits. In addition, there may be BSLs of 128 bits, 256 bits, 512 bits, 1024 bits, and 2048 bits, and a maximum BSL is 4096 bits. Specifically, the BSL is indicated by using four bits in a packet. For example, when the BSL is 64 bits, the BSL is indicated by using 0001 in the packet; when the BSL is 128 bits, the BSL is indicated by using 0010 in the packet; when the BSL is 512 bits, the BSL is indicated by using 0100 in the packet; when the BSL is 1024 bits, the BSL is indicated by using 0101 in the packet. The rest may be deduced by analogy.

3. Set Identifier (SI)

If a quantity of BFER nodes in a network is greater than 256, to adapt to this case, BIER encapsulation not only includes a bit string, but also includes a set identifier (SI). A function of the SI is to group numbers of the BIER nodes into a plurality of different intervals, to support larger-scale network addressing.

The SI may be understood as a set that includes IDs of a plurality of edge BFRs in the network or configured BFR IDs. In an example, when the BSL is 256 bits, but there are more than 256 edge BFRs in the network or there are more than 256 configured BFR IDs, these edge BFRs or BFR IDs need to be grouped into different sets. For example, 256 edge BFRs whose BFR IDs are 1 to 256 constitute a set 0 (set index 0, or SI=0), and 256 edge BFRs whose BFR IDs are 257 to 512 constitute a set 1 (set index 1, or S1).

After receiving a BIER packet, a BFR in a BIER domain may determine, based on a

BIFT ID in a BIER header, which SD the BIER packet belongs to, which BSL is used, and which SI corresponding to the BSL indicates a set to which the packet belongs.

The following lists corresponding SD/BSL/SI combinations represented by several possible BIFT IDs:

BIFT ID=1: corresponding to SD 0, BSL 256, and SI 0//equivalent to SD 0/BSL 256/SI 0

BIFT ID=2: corresponding to SD 0, BSL 256, and SI 1//equivalent to SD 0/BSL 256/SI 1

BIFT ID=3: corresponding to SD 0, BSL 256, and SI 2//equivalent to SD 0/BSL 256/SI 2

BIFT ID=4: corresponding to SD 0, BSL 256, and SI 3//equivalent to SD 0/BSL 256/SI 3

BIFT ID=5: corresponding to SD 0, BSL 512, and SI 0//equivalent to SD 0/BSL 512/SI 0

BIFT ID=6: corresponding to SD 0, BSL 512, and SI 1//equivalent to SD 0/BSL 512/SI 1

BIFT ID=7: corresponding to SD 1, BSL 256, and SI 0//equivalent to SD 1/BSL 256/SI BIFT ID=8: corresponding to SD 1, BSL 256, and SI 1//equivalent to SD 1/BSL 256/SI 1

BIFT ID=9: corresponding to SD 1, BSL 256, and SI 2//equivalent to SD 1/BSL 256/SI BIFT ID=10: corresponding to SD 1, BSL 256, and SI 3//equivalent to SD 1/BSL 256/SI 3

BIFT ID=11: corresponding to SD 1, BSL 512, and SI 0//equivalent to SD 1/BSL 512/SI 0

BIFT ID=12: corresponding to SD 1, BSL 512, and SI 1//equivalent to SD 1/BSL 512/SI 1

It should be noted that a BIFT ID field value corresponds to a triplet <SD, BSL, SI>. Unique <SD, BSL, SI> information can be obtained by using the BIFT-ID field. The <SD, BSL, SI> information has the following functions: The length of the bit string in the BIER packet header is obtained by using the BSL, so that a length of the entire BIER packet header is learned; whether BFR-IDs represented by the bit string are 1 to 256, 257 to 512, or the like can be learned by using BSL and SI information; and a corresponding forwarding table can be found by using SD information.

(2) Bit String Field

Each bit in the bit string is used to identify an edge BFR. For example, a least significant (rightmost) bit in the bit string is used to identify a BFER whose BFR-ID is 1, and the second bit in a direction from right to left in the bit string is used to identify a BFER whose BFR-ID is 2. A forwarding entry based on which forwarding-plane forwarding is performed is used to determine, based on the bit string in the packet, which BFERs the packet is to be sent to. When receiving the BIER packet that includes the BIER header, the BFR in the BIER domain forwards the BIER packet based on the bit string and the BIFT ID that are carried in the BIER header.

It should be noted that, if a value of a bit is 1, it indicates that the packet needs to be sent to a BFER node represented by the BFR-ID; or if a value of a bit is 0, it indicates that the packet does not need to be sent to a BFER node represented by the BFR-ID.

Using BIFT ID=2 as an example, after receiving the BIER packet, the BFR may learn, based on the BIFT ID in the BIER header, that the BIER packet belongs to the SD 0, the BSL used in the BIER header is 256 bits, and the BIER packet belongs to the set 1 (a set that includes 256 edge BFRs whose BFR IDs are 257 to 512).

(3) Traffic Class (TC) Field

This field indicates a packet priority.

(4) Stack (S)

The S is a stack bottom tag. In the BIER packet header, a value of the tag is 1. To be specific, the MPLS label is a bottommost label of an entire label stack.

(5) Version (Ver) Field

This field is four bits long, and indicates an IP version. If a value of this field is 4, it indicates that the version is IPv4. If a value of this field is 6, it indicates that the version is IPv6.

(6) Entropy Field

A plurality of packets belonging to same traffic have a same entropy. A plurality of packets belonging to different traffic have different entropies. During packet forwarding, different traffic may be distributed on different links based on entropies, and a plurality of packets of same traffic are transmitted on a same link.

(7) Proto Field

This field is used to indicate a payload format following the BIER packet header. For example, values 4 and 6 respectively represent an IPv4 packet and an IPv6 packet, and a value 2 represents an MPLS packet to which a label is allocated upstream. This is a proto value used in a multicast virtual private network (MVPN) over BIER. A reason for using the upstream label is as follows: Multicast is point-to-multipoint sending. A transmit-end provider edge (PE) device may allocate a unique label, and send the label to a receive-end PE device by using a control plane. The label allocated by the transmit-end PE device is used for a data packet, and is identified by the receive-end PE device. For the receive-end PE device, the label is allocated by the transmit-end PE device rather than itself, and is referred to as the upstream label.

(8) Nibble

This field has a 4-bit fixed value: 0101. This field is used to differentiate services over MPLS, to distinguish between BIER, IPv4, and IPv6, because in MPLS encapsulation forwarding, an IPv4 or IPv6 header following a label stack is sometimes checked to support ECMP.

(9) BFIR-ID

This field indicates a BFR-ID of a BFIR. When a BFIR node uses a sub-domain to encapsulate and send the BIER packet, the BFIR-ID field needs to be filled with the BFR-ID of the node in the sub-domain.

(10) Bit String

This field indicates a destination node set character string of the BIER packet.

FIG. 3 is a schematic block diagram of another possible BIER header format. Compared with the BIER header format shown in FIG. 2, the BIER header format shown in FIG. 3 does not include a BIFT-ID field, but explicitly includes three fields SD, BSL, and SI. That is, the BIER header format shown in FIG. 3 directly includes the three fields SD, BSL, and SI, and SD, BSL, and SI values do not need to be obtained through mapping based on the BIFT ID field.

It should be noted that fields included in the BIER header format shown in FIG. 3 are similar to the fields included in the BIER header format shown in FIG. 2. For specific descriptions about the fields in the BIER header format shown in FIG. 3, refer to descriptions in FIG. 2. Details are not described herein again.

A process of establishing a BIER forwarding table and forwarding a BIER packet based on a BIER technology is described in detail below with reference to FIG. 4.

A BIER domain shown in FIG. 4 may include a node A to a node F, where the node A, a node D, a node E, and the node F are edge BFRs in the BIER domain, and a node B and a node C are BIER intermediate forwarding nodes. Specifically, the node A is located at an ingress of the BIER domain, is responsible for performing BIER encapsulation on an original multicast data packet, and corresponds to the BFIR in FIG. 1. The node D, the node E, and the node F are located at an egress of the BIER domain, are responsible for decapsulating a BIER packet to obtain the original multicast data packet, and correspond to the BFERs in FIG. 1.

In embodiments of this application, a unique BFR-ID may be allocated to each edge BFR in a BIER domain. For example, in FIG. 4, BFR-IDs configured for the node A, the node D, the node E, and the node F are 4, 1, 2, and 3, respectively. No BFR-ID is allocated to an intermediate forwarding BFR, for example, the node B and the node C.

It should be noted that, in embodiments of this application, "ID" and "id" sometimes may be interchangeably used. It should be noted that, when a difference between the two words is not emphasized, the two words are intended to express a same meaning. The BFR-ID in this application may mean the ID in FIG. 4.

A bit string encapsulated in a BIER header of data traffic indicates all destination nodes of the traffic. For example, a bit string corresponding to the node D whose BFR-ID is 1 is 0001, a bit string corresponding to the node F whose BFR-ID is 2 is 0010, a bit string corresponding to the node E whose BFR-ID is 3 is 0100, and a bit string corresponding to the node A whose BFR-ID is 4 is 1000.

It should be understood that a BFR-ID value allocated to each edge BFR in the BIER domain may be flooded to the other BFRs in the BIER domain by using a routing protocol, and flooded BIER information further includes an IP address and encapsulation information of the edge BFR. For example, flooded BIER information of the node A carries an IP address and a BIFT-ID of the node A. A BFR (for example, the node F in FIG. 4) in the BIER domain may establish a BIFT entry based on flooded BIER information, so that the node F in FIG. 4 forwards the BIER packet to a destination node based on the established BIFT entry after receiving the BIER packet.

For the node A, if the BIER packet needs to be sent to the BFERs whose BFR-IDs are respectively 1, 2, and 3, the BIER packet needs to be first sent to a neighbor (the node B) of the node A. The edge BFR whose BFR-ID is 4 is the node A itself. Therefore, BIFT entries established by the node A are as follows:

a forwarding entry 1: neighbor (Nbr)=B, forwarding bit mask (FBM)=0111; and a forwarding entry 2: Nbr*=A, FBM=1000.

The forwarding entry 1 is used to indicate that, when any one of the first bit, the second bit, and the third bit in a direction from right to left in a bit string in a BIER packet is 1, the BIER packet is sent to the neighbor (the node B) of the node A, where Nbr=B indicates that the neighbor of the node A is the node B.

The forwarding entry 2 is used to indicate that, when the fourth bit in the direction from right to left in a bit string in a BIER packet is 1, the BIER packet is sent to the node A. Because the node A is the node A itself, the node A removes a BIER header, and performs forwarding based on information in an original multicast data packet. It should be noted that * is used in the forwarding entry 2 to indicate that the Nbr is the node itself. For example, for the node A, Nbr*=A indicates that a neighbor node of the node A is the node A itself. Similarly, another node in FIG. 4 may also establish a BIFT entry based on a neighbor node of the node. For BIFT entries established by the other nodes, refer to FIG. 4. Details are not described herein.

After receiving the original multicast data packet, the node A serving as a BFIR at the ingress of the BIER domain prefixes the BIER header to the original multicast data packet for encapsulation. It should be understood that, for ease of description, the node A is referred to as an ingress node A below. In an example, after receiving the original multicast data packet, the ingress node A may learn a destination node of the original multicast data packet based on a BFR-ID flooded by a border gateway protocol BGP message. For example, when a BFR-ID of a receiver of the original multicast data packet is 3, the destination node is E; when a BFR-ID of a receiver of the original multicast data packet is 2, the destination node is F; when a BFR-ID of a receiver of the original multicast data packet is 1, the destination node is D. The ingress node A uses a bit string 0111 for BIER header encapsulation, and forwards the encapsulated BIER packet to the neighbor node B based on the forwarding entry 1. After receiving the BIER packet, the node B determines, based on the bit string 0111 and a BIFT entry, that the BIER packet needs to be sent to each of the node C and the node E. When sending the BIER packet to the node C, the node B may perform an AND operation on the bit string (0111) in the BIER header and an FBM field corresponding to Nbr=C in the BIFT entry. In this embodiment of this application, an AND result is 0011. Therefore, the node B may change the bit string in the BIER header to 0011, and send the BIER packet to the node C. Similarly, when sending the BIER packet to the node E, the node B may change the bit string in the BIER header to 0100. After receiving the BIER packet, the node E determines, based on the bit string 0100, that the BIER packet needs to be sent to the neighbor node E. The node E determines, based on the identifier * in a forwarding table, that the neighbor node E is the node E itself. Therefore, the node E serving as a BFER at the egress of the BIER domain may decapsulate the BIER packet to obtain the original multicast data packet, and perform forwarding based on information in the inner original multicast data packet.

In BIER-MPLS encapsulation, the first 32 bits of the BIER header are an MPLS label code, and the first 20 bits in the first 32 bits are an MPLS label value. The MPLS label value changes in a forwarding process. For example, when the ingress node A sends the packet to the node B, an MPLS label value of the node B needs to be encapsulated, and when the node B sends the packet to the node C, an MPLS label value of the node C needs to be encapsulated. In this embodiment of this application, MPLS label values allocated to the node A, the node B, the node C, the node D, the node E, and the node F are respectively 100, 200, 300, 400, 500, and 600. These MPLS label values need to be carried in the foregoing BIER encapsulation information, and flooded to the other BFRs in the BIER domain by using the routing protocol, so that the node A can learn the MPLS label value of the node B. Such an MPLS label that indicates BIER information is also referred to as a BIER label.

In this embodiment of this application, a bit position configured by the edge BFR is flooded in the BIER domain in advance by using an interior gateway protocol (IGP) or a border gateway protocol (BGP), so that each BFR in the BIER domain forms a bit index forwarding table (BIFT) used to guide forwarding of the original multicast data packet in the BIER domain. Such information flooded in the BIER domain based on the IGP or BGP may be referred to as BIER information. When receiving the BIER packet encapsulated with the BIER header, the BFR forwards the BIER packet to the destination node based on a BIFT entry.

In this embodiment of this application, the interior gateway protocol IGP may include but is not limited to an open shortest path first (OSPF) protocol, an intermediate system to intermediate system (ISIS) protocol, and the like.

It should be understood that a BIER domain is a network area in which BIER information can be flooded by using the IGP or BGP and a BIFT entry can be established, and a BIER domain includes a BFIR and a BFER. The BIER information may include but is not limited to a BFR ID of each of the foregoing edge BFRs. In an example, in an autonomous system (AS) domain, the IGP is deployed and BIER information is flooded. In this case, the AS domain is a BIER domain.

Usually, when a network scale is comparatively large, a network is divided into a plurality of domains, for example, divided into different ASs based on different management domains. A boundary of an AS may be an autonomous system boundary router (ASBR). In different AS domains, the IGP may be deployed and BIER information may be flooded. Between a plurality of AS domains, the BGP is deployed, but BIER information is not flooded. In this case, the plurality of AS domains may be a plurality of different BIER domains.

Figure 5:
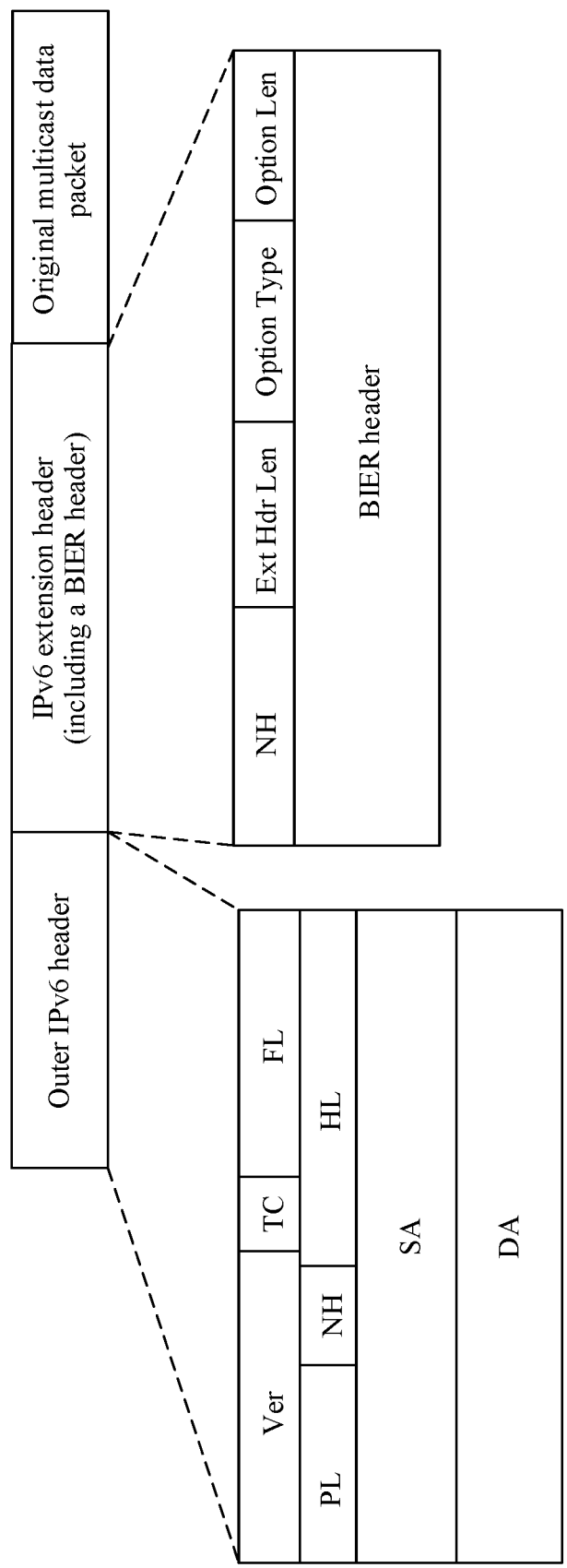
FIG. 5 is a schematic diagram of a possible packet format of BIERv6 encapsulation according to an embodiment of this application.

The following describes in detail a related technology of BIERv6 encapsulation with reference to FIG. 5.

It should be understood that BIERv6 encapsulation is a solution formed by combining advantages of native IPv6 and BIER. A packet format in BIERv6 encapsulation is: IPv6 header+BIER header+original multicast data packet. The BIER header may be included in an IPv6 extension header, and the original multicast data packet is used as a payload of the outer IPv6 header.

In such encapsulation, the IPv6 header and the IPv6 extension header that includes the BIER header jointly constitute an outer packet header of the inner original multicast data packet, and the outer packet header may also be referred to as a BIERv6 header in embodiments of this application.

The IPv6 extension header that includes the BIER header is not specifically limited in embodiments of this application. For example, the IPv6 extension header may be a destination options header (DOH). For another example, the IPv6 extension header may be alternatively a routing header (RH).

FIG. 5 is a schematic block diagram of possible BIERv6 encapsulation. Referring to FIG. 5, a BIER header may be located in an IPv6 extension header, for example, in a DOH.

It should be understood that options in the DOH are in a type-length-value (TLV) format, where the BIER header is used as option data in option TLV of the DOH, a format of the BIER header is indicated by an option type in the option TLV, and a length of the BIER header is indicated by an option length in the option TLV.

It should be noted that, in BIERv6 encapsulation, a BIER header format in a DOH is not specifically limited in embodiments of this application, provided that a BIER header includes a bit string field. A BIER header format may be the format shown in FIG. 2, the format shown in FIG. 3, or another format. For example, in BIERv6 encapsulation, a proto field, a DSCP field, and the like may be further deleted from a BIER header, provided that the BIER header includes a bit string used for bit index explicit replication. For specific detailed descriptions about a BIER header format, refer to descriptions in FIG. 2 or FIG. 3. Details are not described herein again.

The following describes in detail fields included in an outer IPv6 header.

Version (Ver): This field indicates an IP version. When a value of this field is 6, it indicates that the IP version is IPv6.

Traffic class (TC) field: This field indicates a packet priority.

Flow label (FL) field: A plurality of packets belonging to same traffic may be attached with a same flow label, and a plurality of packets belonging to different traffic may be attached with another flow label value. During packet forwarding, different traffic may be distributed on different links based on flow labels, and a plurality of packets of same traffic are transmitted on a same link.

Payload length (PL) field: This field indicates a packet length.

Next header (NH) field: This field indicates a type of a next header of a packet, for example, may represent an IPv6 extension header.

Hop limit (HL) field: This field indicates a limitation on a hop count of the packet.

Source address (SA) field: This field indicates a source address of the packet.

Destination address (DA) field: This field indicates a destination address of the packet.

The BIER domain shown in FIG. 4 is used as an example. After receiving a user multicast data packet, the node A serving as an ingress node of an IPv6 network encapsulates the packet with a BIERv6 header, that is, an outer IPv6 header and an IPv6 extension header that includes a BIER header, to obtain an encapsulated BIERv6 packet. The BIER packet header included in the IPv6 extension header carries a bit string indicating a destination node set.

The node A sends the encapsulated BIERv6 packet to B based on the BIER packet header and bit string information of the BIER packet header. During the sending, a unicast address (for example, B::100) of B may be used in a destination address field in the IPv6 header. The node B sends the packet to C and E based on the BIER packet header and the bit string information of the BIER packet header. During the sending, a unicast address (for example, C::100) of C and a unicast address (for example, E::100) of E may be used in the destination address field in the IPv6 header. Similarly, the node C sends the packet to D and F based on the BIER packet header and the bit string information of the BIER packet header. During the sending, a unicast address (for example, D::100) of D and a unicast address (for example, F::100) of F may be used in the destination address field in the IPv6 header.

As importance is attached to network security, detection of invalid packets is particularly important. In a possible case, in a forwarding process, the BIER packet is easily attacked by an attacker, causing the BIER packet to become an invalid BIER packet. A network architecture shown in FIG. 1 is used as an example. In an example, an attacker may attack a link between a BFIR1 and a BFR, and connect the link to a device of the attacker to make an attack. For example, after receiving a BIER packet sent by the BFIR1, the attacker tampers forwarding information in packet header information of the BIER packet, and then sends a tampered BIER packet to the BFR. As a result, multicast traffic may be replicated in large quantities in a BIER domain, and sent to a device that does not need to receive the multicast traffic. This causes a waste of link bandwidth, and even causes denial of service (DoS) on a link.

It should be understood that the forwarding information may be information that is in the packet header information of the BIER packet and that is used to guide forwarding of the BIER packet to the receiver, in a forwarding process of the BIER packet. The forwarding information may include at least one of the following: a sub-domain SD, a bit string length BSL, a set identifier SI, and a bit index forwarding table identifier BIFT-ID. Optionally, the forwarding information may further include a BIER forwarding ingress router identifier BFIR ID field in the packet header information. Optionally, the forwarding information may further include a source IPv6 address field. Specifically, the forwarding information is related to a format of the packet header information with which the BIER packet is encapsulated. The following provides detailed descriptions with reference to a specific example, and details are not described herein.

According to a packet verification method provided in embodiments of this application, an invalid BIER packet can be detected, and security in a BIER packet forwarding process or accuracy of BIER packet encapsulation can be enhanced.

Figure 6:
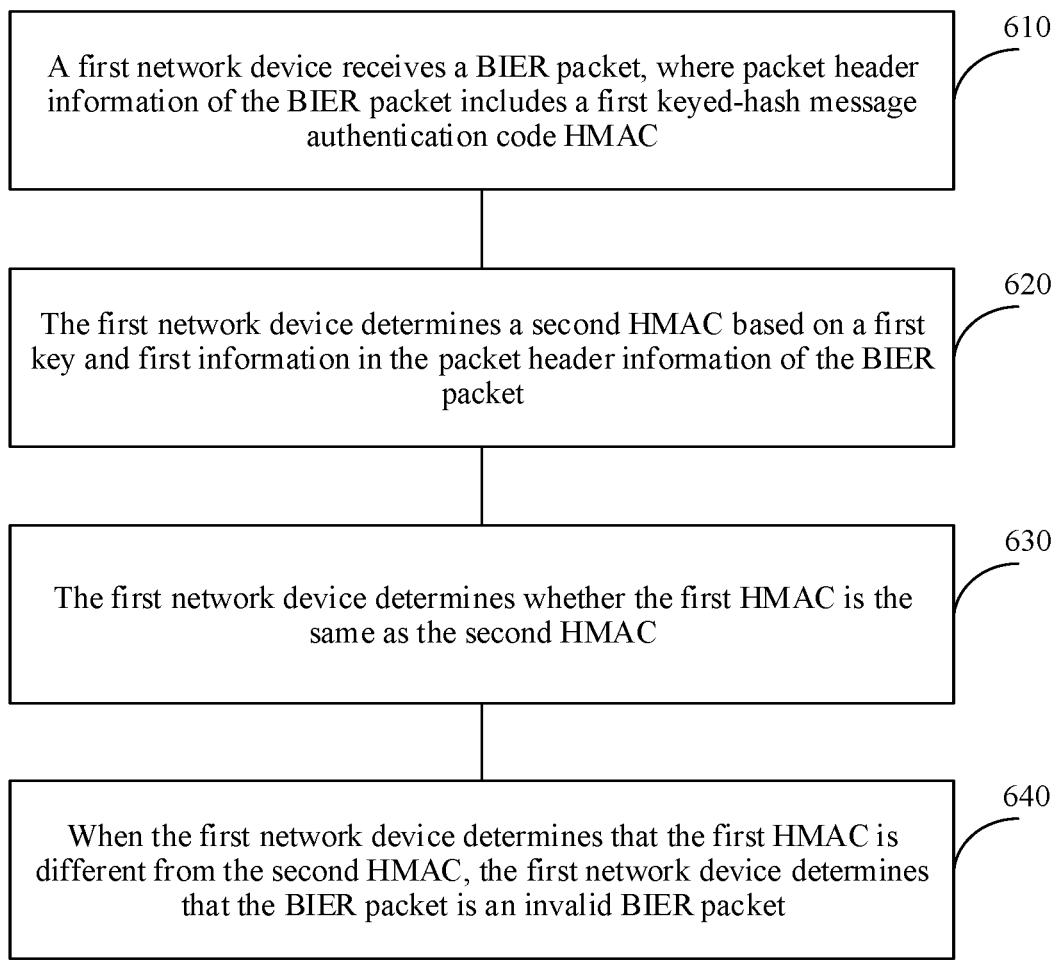
FIG. 6 is a schematic flowchart of a packet verification method according to an embodiment of this application.

FIG. 6 is a schematic flowchart of a packet verification method according to an embodiment of this application. Referring to FIG. 6, the method may include steps 610 to 640. The following describes in detail steps 610 to 640 separately.

Step 610: A first network device receives a BIER packet, where packet header information of the BIER packet includes a first keyed-hash message authentication code (HMAC).

In this embodiment of this application, the first network device may correspond to the BFR or BFER in FIG. 1, and the first network device can receive the BIER packet. The packet header information with which the BIER packet is encapsulated may have a plurality of formats. This is not specifically limited in this application. For example, the packet header information of the BIER packet may be in the BIER header format shown in FIG. 2. For another example, the packet header information of the BIER packet may be alternatively in the BIER header format shown in FIG. 3. For another example, the packet header information of the BIER packet may be alternatively in a BIERv6 header format shown in FIG. 5.

The packet header information of the BIER packet carries the first HMAC, and the first HMAC is used by the first network device to verify whether the BIER packet is a valid BIER packet. It should be understood that the first HMAC is determined by an ingress node (for example, the BFIR1 or BFIR2 shown in FIG. 1) based on a configured first key and first information in the packet header information when encapsulating the packet header information of the BIER packet, and is carried in the packet header information of the BIER packet forwarded to another node. A location in the packet header information for carrying the first HMAC is not specifically limited in this embodiment of this application. The following provides descriptions with reference to a specific example, and details are not described herein.

It should be understood that an HMAC algorithm is a method for performing message authentication based on a hash function and a key, and is an encryption algorithm. A key is introduced into the algorithm. Because a used key is agreed upon by two parties in advance, and cannot be known by a third party, the third party cannot forge a same HMAC result, and security is comparatively high.

It should be noted that, in this embodiment of this application, when the ingress node (for example, the BFIR1 or BFIR2 shown in FIG. 1) calculates the first HMAC, the first key used in the calculation may be manually configured by an administrator, or may be centrally delivered and configured by a network management device. This is not specifically limited in this application.

It should be further noted that the first information used by the ingress node to calculate the first HMAC may be a field that is in the packet header information and that is used to guide forwarding of the BIER packet, and the field used to guide forwarding of the BIER packet does not need to be changed during forwarding of the BIER packet.

For example, the packet header information is the BIER header shown in FIG. 2. In this case, the first information may be a value of a BIFT ID field. Optionally, because the BIER header format shown in FIG. 2 does not directly include SD, BSL, and SI fields, and the SD, BSL, and SI fields are three implicit fields, SD, BSL, and SI values need to be further obtained through mapping based on the BIFT ID field.

For another example, the packet header information is the BIER header shown in FIG. 3. In this case, the first information may be any one or more of an SD, a BSL, or an SI.

For another example, the packet header information is the BIERv6 header shown in FIG. 5. If a BIER header included in an IPv6 extension header of the BIERv6 header is in the format shown in FIG. 2, the first information may be a value of a BIFT ID field. If a BIER header included in an IPv6 extension header of the BIERv6 header is in the format shown in FIG. 3, the first information may be any one or more of an SD, a BSL, or an SI.

Optionally, in some embodiments, the first information used in HMAC calculation may further include a value of a BFIR ID field in the BIER header format.

Optionally, in some embodiments, if the packet header information is the BIERv6 header shown in FIG. 5, the first information used in HMAC calculation may further include a value of a source IPv6 address field.

Step 620: The first network device determines a second HMAC based on the first key and the first information in the packet header information of the BIER packet.

After receiving the BIER packet, the first network device may determine the second HMAC based on the first key locally configured on the first network device and the first information in the packet header information of the BIER packet. It should be understood that, similarly to that for the ingress node, the first key used by the first network device to calculate the second HMAC may be manually configured by the administrator, or may be centrally delivered and configured by the network management device, or may be delivered by the ingress node to the first network device. This is not specifically limited in this application.

The first information used by the first network device to calculate the second HMAC should be the same as the first information used by the ingress node to calculate the first HMAC. There may be a plurality of specific implementations. This is not specifically limited in this application.

In a possible implementation, the ingress node and the first network device may configure and use the same first information according to a network protocol. For example, the network protocol uniformly specifies the first information used in HMAC calculation. In this way, the first information used by the first network device to calculate the second HMAC can be the same as the first information used by the ingress node to calculate the first HMAC.

In another possible implementation, alternatively, the ingress node may deliver, to the first network device, the first information used by the ingress node to calculate the first HMAC. In this way, the first information used by the first network device to calculate the second HMAC can be the same as the first information used by the ingress node to calculate the first HMAC.

In another possible implementation, alternatively, the ingress node may add indication information to the packet header information of the BIER packet, where the indication information may indicate the first information used by the ingress node to calculate the first HMAC. In this way, the first information used by the first network device to calculate the second HMAC can be the same as the first information used by the ingress node to calculate the first HMAC.

Specifically, the packet header information of the BIER packet further includes an HMAC flag field, and a flag bit in the HMAC flag field indicates the first information used in calculation of the second HMAC.

It should be understood that the HMAC flag field may include a plurality of flag bits, and the plurality of flag bits may represent the first information (one or more fields in the packet header information of the BIER packet). Each flag bit may represent one field, and if the flag bit is set, it may be understood as that a value of a field corresponding to the flag bit is used for HMAC calculation.

Optionally, the indication information may further indicate that, when the ingress node calculates the first HMAC, another optional field in the packet header information is further used in addition to the first information uniformly specified in the network protocol. In this way, when the first network device calculates the second HMAC, according to the indication information, the first information used by the first network device to calculate the second HMAC can be the same as the first information used by the ingress node to calculate the first HMAC.

For descriptions about the first information, refer to descriptions in step 610. Details are not described herein again.

Step 630: The first network device determines whether the first HMAC is the same as the second HMAC.

In this embodiment of this application, the first information used by the ingress node to calculate the first HMAC may be the field that is in the packet header information and that is used to guide forwarding of the BIER packet, and the field used to guide forwarding of the BIER packet does not need to be changed during forwarding of the BIER packet. Therefore, after receiving the BIER packet, another forwarding device (for example, the first network device) in a BIER domain may calculate the second HMAC based on the first key and the first information that are the same as those used by the ingress node to calculate the first HMAC, and compare whether the second HMAC is the same as the first HMAC.

If the second HMAC calculated by the first network device is the same as the first HMAC carried in the packet header information of the BIER packet, it may be understood as that the BIER packet is a valid packet. For example, the first information in the packet header information is not maliciously tampered during forwarding of the BIER packet.

If the second HMAC calculated by the first network device is different from the first HMAC carried in the packet header information of the BIER packet, it may be understood as that the BIER packet is an invalid packet. For example, the first information in the packet header information is maliciously tampered during forwarding of the BIER packet.

Step 640: When the first network device determines that the first HMAC is different from the second HMAC, the first network device determines that the BIER packet is an invalid BIER packet.

In this embodiment of this application, when the first network device determines that the first HMAC is different from the second HMAC, the first network device determines that the BIER packet is an invalid BIER packet.

Optionally, in some embodiments, after determining that the BIER packet is an invalid BIER packet, the first network device may further process the invalid BIER packet, for example, record log information or send an alarm. In this way, management personnel can find that the forwarded BIER packet is an invalid packet, thereby enhancing security in a BIER packet forwarding process or accuracy of BIER packet encapsulation.

In the foregoing technical solution, after receiving the BIER packet, the first network device may determine the second HMAC based on the configured key and the first information in the packet header information, and compare whether the first HMAC carried in the BIER packet is the same as the second HMAC. If the first HMAC is the same as the second HMAC, it indicates that the BIER packet is not subjected to unauthorized modification, and the BIER packet may be considered as a valid packet. Otherwise, the BIER packet may be considered as an invalid packet. In this way, it can be detected whether the BIER packet is an invalid packet, or a probability of detecting whether the BIER packet is an invalid packet can be increased. Security in a BIER packet forwarding process can be enhanced. In addition, an error or a mistake in encapsulating the packet header information of the BIER packet by the ingress node in the BIER domain can be avoided, thereby improving accuracy of BIER packet encapsulation.

Further, in the solution provided in this embodiment of this application, an unauthorized device can also be locked out by identifying an invalid BIER packet, or it can be determined whether a network device that forwards and processes the BIER packet is faulty.

Figure 7:
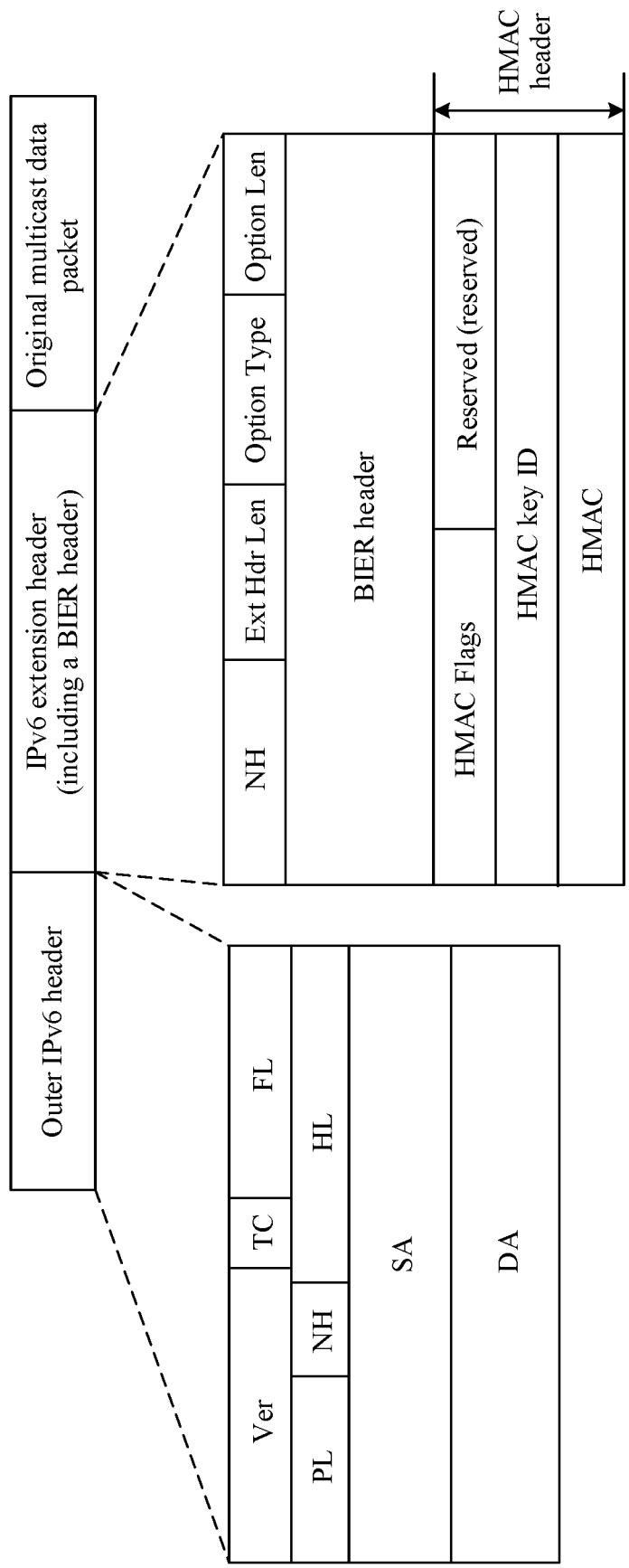
FIG. 7 is a schematic diagram of a possible BIER packet according to an embodiment of this application.
Figure 8:
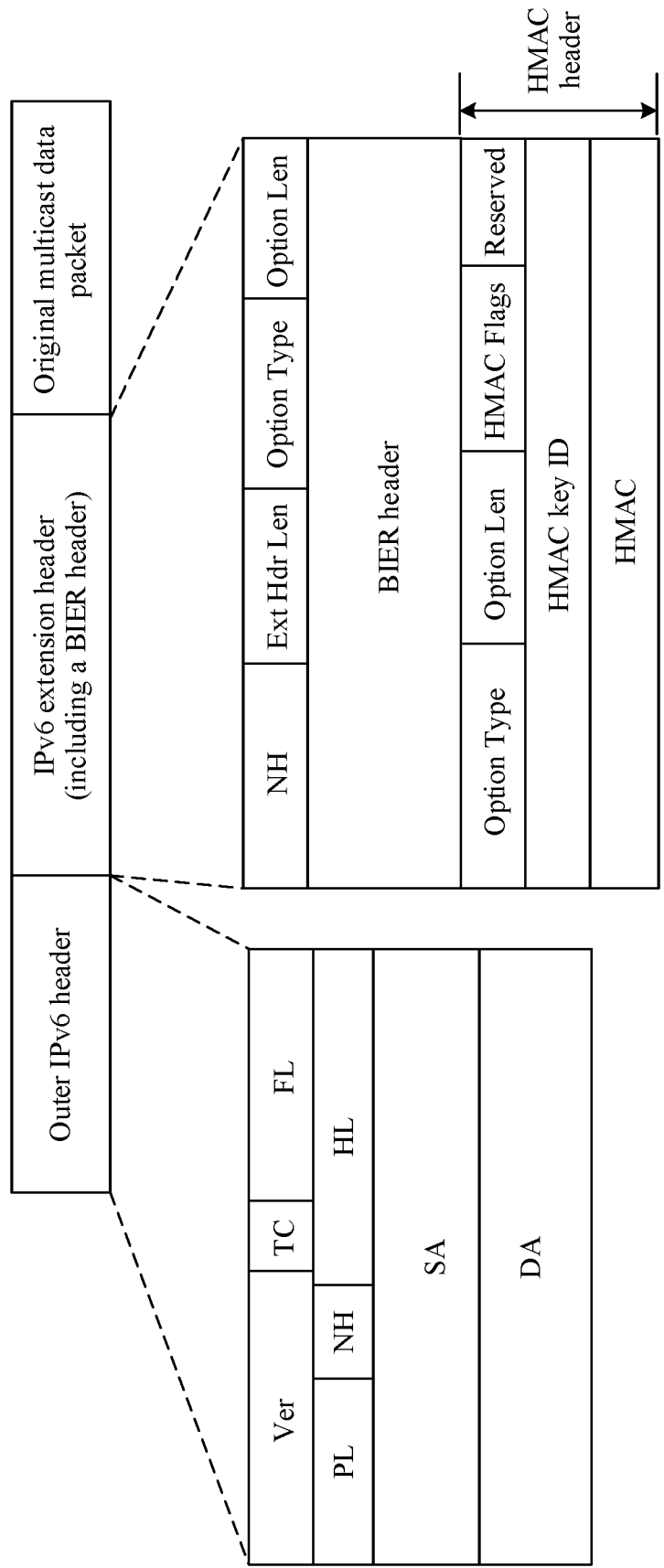
FIG. 8 is a schematic diagram of another possible BIER packet according to an embodiment of this application.
Figure 9:
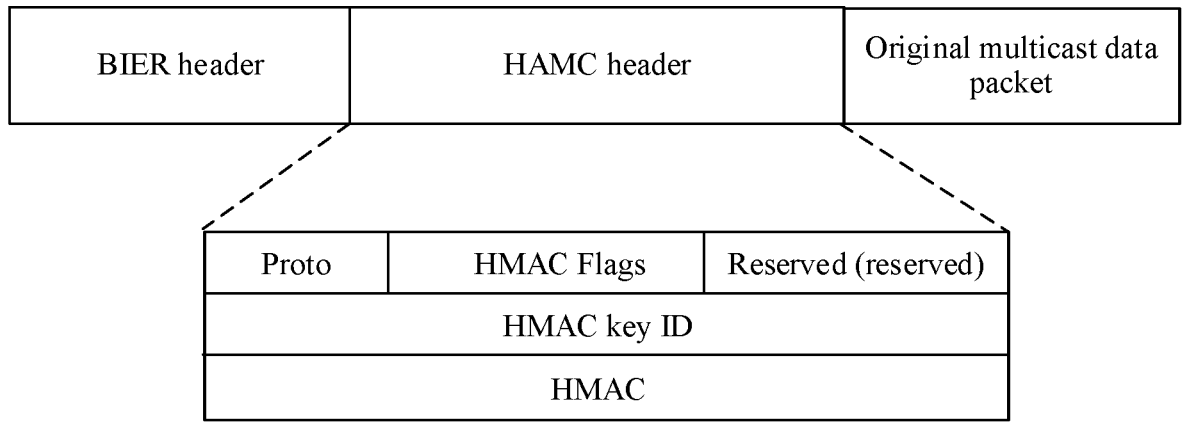
FIG. 9 is a schematic diagram of another possible BIER packet according to an embodiment of this application.

With reference to FIG. 7 to FIG. 9, the following describes specific implementations in which the packet header information of the BIER packet carries the first HMAC. It should be understood that examples in FIG. 7 to FIG. 9 are merely intended to help a person skilled in the art understand embodiments of this application, but are not intended to limit embodiments of this application to specific values or specific scenarios in the examples. Apparently, a person skilled in the art can make various equivalent modifications or changes based on the examples in FIG. 7 to FIG. 9, and such modifications or changes also fall within the scope of embodiments of this application.

FIG. 7 is a schematic diagram of a possible BIER packet according to an embodiment of this application.

As shown in FIG. 7, the BIER packet is encapsulated based on BIERv6. The BIER packet includes outer packet header information and an inner original multicast data packet. The packet header information may include an outer IPv6 header and an IPv6 extension header, and the IPv6 extension header includes a BIER header and an HMAC field.

The HMAC field may include a first HMAC calculated by an ingress node, and the first HMAC is used by another device in a BIER domain to verify whether the BIER packet is a valid BIER packet.

It should be understood that, provided that a BIER header format includes a bit string (bit string) field, the BIER header format may be the format shown in FIG. 2, the format shown in FIG. 3, or another format. This is not specifically limited in this application.

Optionally, the packet header information of the BIER packet shown in FIG. 7 further includes an HMAC flag field. A flag bit in the HMAC flag field indicates the first information used by the ingress node to calculate the first HMAC, or is used to indicate that, when the ingress node calculates the first HMAC, another optional field in the packet header information is further used in addition to the first information uniformly specified in the network protocol. In this way, when the first network device calculates the second HMAC, according to the indication information, the first information used by the first network device to calculate the second HMAC can be the same as the first information used by the ingress node to calculate the first HMAC.

Specifically, in an example, in this embodiment of this application, the first information used in calculation of the first HMAC includes a BIFT-ID field, a TC field, an entropy field, a DSCP field, a proto field, and a BFIR-ID field. In a possible implementation, the flag bit in the HMAC flag field indicates that the first information used in HMAC calculation includes the BIFT-ID field, the TC field, the entropy field, the DSCP field, the proto field, and the BFIR-ID field. In this way, the first network device can determine the second HMAC based on the first key and values of the BIFT-ID field, the TC field, the entropy field, the DSCP field, the proto field, and the BFIR-ID field according to the indication information when calculating the second HMAC, and determine whether the BIER packet is a valid packet by comparing whether the second HMAC is the same as the first HMAC. In another possible implementation, the network protocol uniformly specifies that the first information used in HMAC calculation includes a BIFT-ID field, and the flag bit in the HMAC flag field indicates that information used in HMAC calculation further includes a TC field, an entropy field, a DSCP field, a proto field, and a BFIR-ID field. In this way, the first network device can determine the second HMAC based on the first key and values of the BIFT-ID field, the TC field, the entropy field, the DSCP field, the proto field, and the BFIR-ID field according to the indication information when calculating the second HMAC, and determine whether the BIER packet is a valid packet by comparing whether the second HMAC is the same as the first HMAC.

Optionally, in some embodiments, the packet header information of the BIER packet shown in FIG. 7 may further include a key ID, for example, include an ID of the first key used by the ingress node to calculate the first HMAC carried in the packet. In this way, the first network device can determine the used key when receiving the BIER packet and calculating the second HMAC based on the first information in the packet header information.

It should be noted that the key used for calculating the second HMAC may be delivered by the ingress node to the first network device, or may be centrally delivered and configured by a network management device, or may be manually configured by an administrator, provided that the key used by the ingress node to calculate the HMAC is the same as a key used by a forwarding node (for example, the first network device) in BIER domain.

Specifically, in an example, as shown in FIG. 7, the packet header information of the BIER packet may further include an HMAC key identifier (HMAC key ID) field, and the HMAC key ID field includes the key ID.

Optionally, in some embodiments, the packet header information of the BIER packet shown in FIG. 7 may further include an ID of an algorithm, and the algorithm is an algorithm for indicating the first network device to determine the second HMAC.

In this embodiment of this application, the ID of the algorithm may be located in the HMAC key identifier (HMAC key ID) field, or may be located in another field, for example, a reserved field in FIG. 7.

It should be understood that the HMAC flags field, the reserved field, the HMAC key ID field, and the HMAC field shown in FIG. 7 may also be referred to as an HMAC header.

FIG. 8 is a schematic diagram of another possible BIER packet according to an embodiment of this application.

As shown in FIG. 8, the BIER packet is encapsulated based on BIERv6. The BIER packet includes outer packet header information and an inner original multicast data packet. The packet header information may include an outer IPv6 header and an IPv6 extension header, and the IPv6 extension header includes a BIER header and an HMAC field.

The HMAC field may include a first HMAC calculated by an ingress node, and the first HMAC is used by another device in a BIER domain to verify whether the BIER packet is a valid BIER packet.

It should be understood that, provided that a BIER header format includes a bit string field, the BIER header format may be the format shown in FIG. 2, the format shown in FIG. 3, or another format. This is not specifically limited in this application.

It should be further understood that an HMAC flags field, a reserved field, and an HMAC key ID field in the IPv6 extension header are optional.

As shown in FIG. 8, an HMAC header is defined as a type-length-value (TLV) format. The HMAC flags field, the reserved field, the HMAC key ID field, and the HMAC field are used as option data in option TLV, a format thereof is indicated by an option type in the option TLV, and a length thereof is indicated by an option length in the option TLV. TLV is a structure with delimitation information, and therefore can be conveniently used in combination with another structure. In this embodiment of this application, TLV of the BIER header carries HMAC-TLV. In some cases, the HMAC TLV is used alone. Alternatively, such an HMAC TLV header format may be reused for another header. In this way, an HMAC mechanism can be used more flexibly.

FIG. 9 is a schematic diagram of another possible BIER packet according to an embodiment of this application. As shown in FIG. 9, the BIER packet includes an outer BIER header and an HMAC header.

Provided that a BIER header format includes a bit string field, the BIER header format may be the format shown in FIG. 2, the format shown in FIG. 3, or another format. This is not specifically limited in this application.

The HMAC header may include an HMAC field. Optionally, the HMAC header may further include one or more of the following fields: an HMAC flags field, a reserved field, and an HMAC key ID field. For specific descriptions about the foregoing fields, refer to descriptions in FIG. 7. Details are not described herein again.

In the BIER packet shown in FIG. 9, a specific value is used in a proto field of the BIER header to indicate that the BIER header is followed by the HMAC header, and a proto field in the HMAC header is used to indicate a format of an original multicast data packet following the HMAC header.

The foregoing describes in detail the packet verification method provided in embodiments of this application, with reference to FIG. 1 to FIG. 9. The following describes in detail apparatus embodiments of this application with reference to FIG. 10 to FIG. 15. It should be understood that descriptions of the method embodiments correspond to descriptions of the apparatus embodiments. Therefore, for a part that is not described in detail, refer to the foregoing method embodiments.

Figure 10:
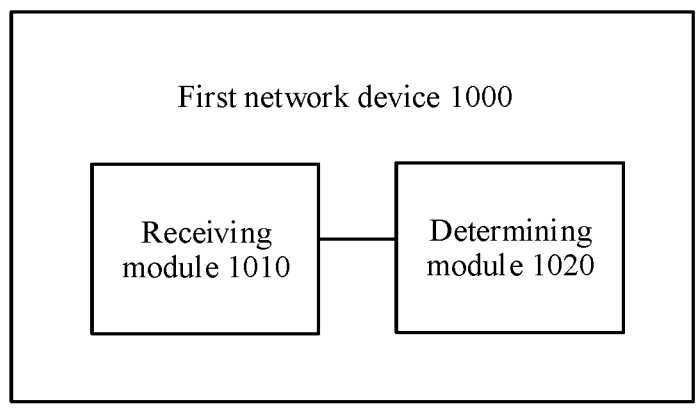
FIG. 10 is a schematic diagram of a structure of a first network device 1000 according to an embodiment of this application.

FIG. 10 is a schematic diagram of a structure of a first network device 1000 according to an embodiment of this application. The first network device 1000 shown in FIG. 10 may perform corresponding steps performed by the first network device in the method in the foregoing embodiments. As shown in FIG. 10, the first network device 1000 includes a receiving module 1010 and a determining module 1020.

The receiving module 1010 is configured to receive a bit index explicit replication BIER packet, where packet header information of the BIER packet includes a first keyed-hash message authentication code HMAC, and the first HMAC is used to verify whether the BIER packet is a valid BIER packet.

The determining module 1020 is configured to determine a second HMAC based on a first key and first information in the packet header information, where the first information is used to indicate forwarding information of the BIER packet.

The determining module 1020 is further configured to determine whether the first HMAC is the same as the second HMAC.

The determining module 1020 is further configured to: when determining that the first HMAC is different from the second HMAC, determine that the BIER packet is an invalid BIER packet.

Optionally, the determining module 1020 is further configured to: when determining that the first HMAC is the same as the second HMAC, determine that the BIER packet is a valid BIER packet.

The first network device 1000 further includes: a forwarding module 1030, configured to forward the BIER packet.

Optionally, the first information includes at least one of the following: a sub-domain SD, a bit string length BSL, and a set identifier SI.

Optionally, the first information includes a bit index forwarding table identifier BIFT-ID.

Optionally, the determining module 1020 is specifically configured to: determine, based on the BIFT-ID, an SD, a BSL, and an SI that correspond to the BIER packet; and determine the second HMAC based on the first key and at least one of the following: the SD, the BSL, and the SI.

Optionally, the first information further includes a BIER forwarding ingress router identifier BFIR-ID.

Optionally, the packet header information of the BIER packet includes an internet protocol version 6 IPv6 header, and the first information further includes a source IPv6 address field.

Optionally, the packet header information of the BIER packet further includes an HMAC flag field, and a flag bit in the HMAC flag field indicates the first information used in calculation of the second HMAC.

Optionally, the packet header information of the BIER packet further includes an identifier ID of the first key.

Optionally, the packet header information of the BIER packet further includes an HMAC key field, and the HMAC key field includes the identifier ID of the first key.

Optionally, the packet header information of the BIER packet further includes an identifier ID of an algorithm, and the algorithm is an algorithm for indicating the first network device to determine the second HMAC.

Figure 11:
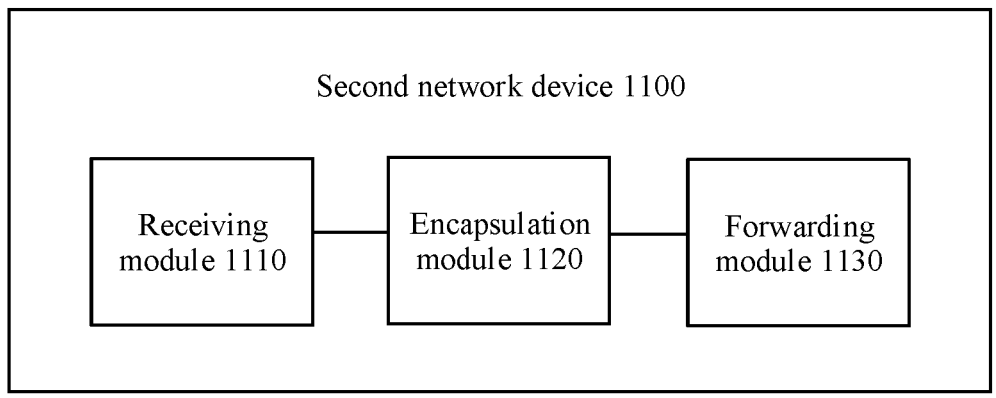
FIG. 11 is a schematic diagram of a structure of a second network device 1100 according to an embodiment of this application.

FIG. 11 is a schematic diagram of a structure of a second network device 1100 according to an embodiment of this application. The second network device 1100 shown in FIG. 11 may perform corresponding steps performed by the second network device in the method in the foregoing embodiments. As shown in FIG. 11, the second network device 1100 includes a receiving module 1110, an encapsulation module 1120, and a forwarding module 1130.

The receiving module 1110 is configured to receive a multicast data packet.

The encapsulation module 1120 is configured to encapsulate the multicast data packet to obtain a bit index explicit replication BIER packet, where the BIER packet carries a first keyed-hash message authentication code HMAC, the first HMAC is determined by the second network device based on a first key and first information in packet header information of the BIER packet, the first information is used to indicate forwarding information of the BIER packet, and the first HMAC is used to verify whether the BIER packet is a valid BIER packet.

The forwarding module 1130 is configured to forward the BIER packet.

Optionally, the first information includes at least one of the following: a sub-domain SD, a bit string length BSL, and a set identifier SI.

Optionally, the first information includes a bit index forwarding table identifier BIFT-ID.

Optionally, the encapsulation module 1120 is specifically configured to: determine, based on the BIFT-ID, an SD, a BSL, and an SI that correspond to the BIER packet; and determine the first HMAC based on the first key and at least one of the following: the SD, the BSL, and the SI.

Optionally, the first information further includes a BIER forwarding ingress router identifier BFIR ID.

Optionally, the packet header information of the BIER packet includes an internet protocol version 6 IPv6 header, and the first information further includes a source IPv6 address field.

Optionally, the packet header information of the BIER packet further includes an HMAC flag field, and a flag bit in the HMAC flag field indicates the first information used in calculation of the first HMAC.

Optionally, the packet header information of the BIER packet further includes an identifier ID of the first key.

Optionally, the packet header information of the BIER packet further includes an HMAC key field, and the HMAC key field includes the identifier ID of the first key.

Optionally, the packet header information of the BIER packet further includes an ID of an algorithm, and the algorithm is an algorithm for indicating the second network device to determine the first HMAC.

Figure 12:
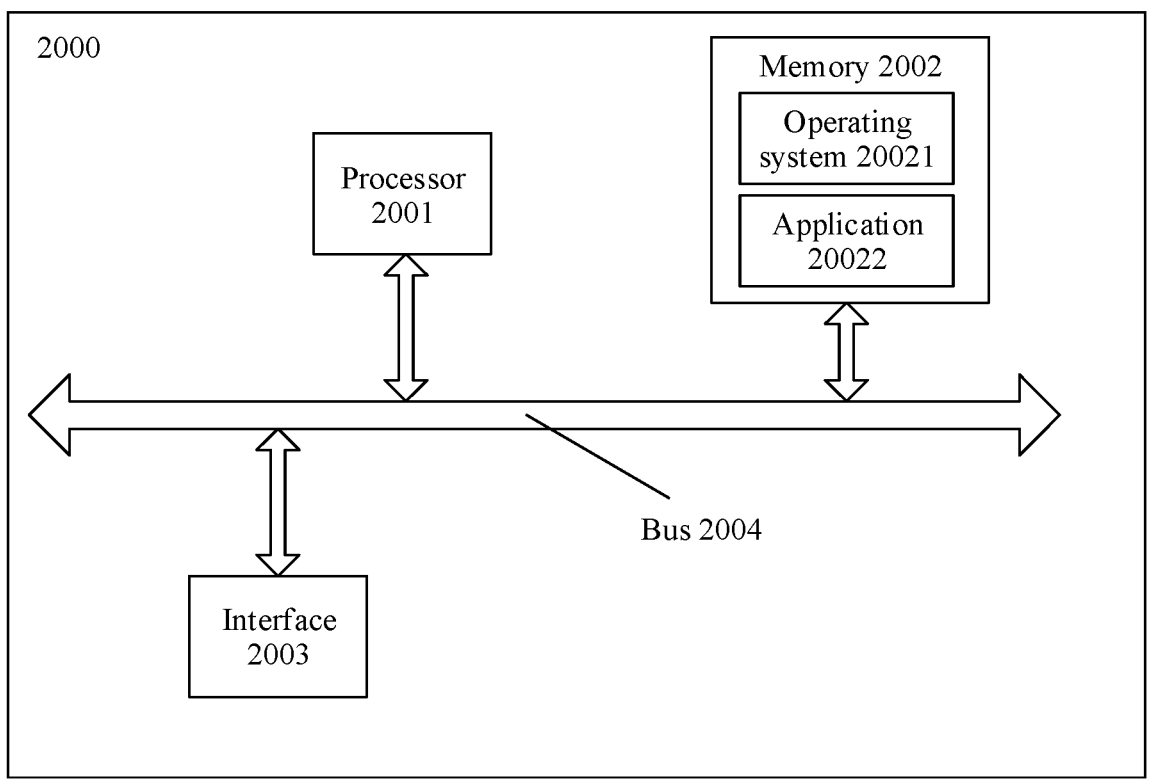
FIG. 12 is a schematic diagram of a hardware structure of a first network device 2000 according to an embodiment of this application.

FIG. 12 is a schematic diagram of a hardware structure of a first network device 2000 according to an embodiment of this application. The first network device 2000 shown in FIG. 12 may perform corresponding steps performed by the first network device in the method in the foregoing embodiments.

As shown in FIG. 12, the first network device 2000 includes a processor 2001, a memory 2002, an interface 2003, and a bus 2004. The interface 2003 may be implemented in a wireless or wired manner, and specifically, may be a network adapter. The processor 2001, the memory 2002, and the interface 2003 are connected by using the bus 2004.

The interface 2003 may specifically include a transmitter and a receiver, so that the first network device implements the foregoing sending and receiving. For example, the interface 2003 is configured to receive a bit index explicit replication BIER packet.

The processor 2001 is configured to perform processing performed by the first network device in the foregoing embodiments, for example, is configured to determine a second HMAC based on a first key and first information in packet header information; is further configured to determine whether a first HMAC is the same as the second HMAC; and is further configured to: when determining that the first HMAC is different from the second HMAC, determine that the BIER packet is an invalid BIER packet; and/or is used for another process of the technology described in this specification. The memory 2002 includes an operating system 20021 and an application program 20022, and is configured to store a program, code, or instructions. When the processor or a hardware device executes the program, code, or instructions, a processing process related to the first network device in the method embodiments can be implemented. Optionally, the memory 2002 may include a read-only memory (ROM) and a random access memory (RAM). The ROM includes a basic input/output system (BIOS) or an embedded system. The RAM includes the application program and the operating system. When the first network device 2000 needs to be run, the system is booted by using the BIOS fixed in the ROM or a bootloader in the embedded system, so as to boot the first network device 2000 to enter a normal running state. After the first network device 2000 enters the normal running state, the application program and the operating system in the RAM are run, thereby implementing the processing process related to the first network device 2000 in the method embodiments.

It can be understood that FIG. 12 shows only a simplified design of the first network device 2000. In actual application, the first network device may include any quantity of interfaces, processors, or memories.

Figure 13:
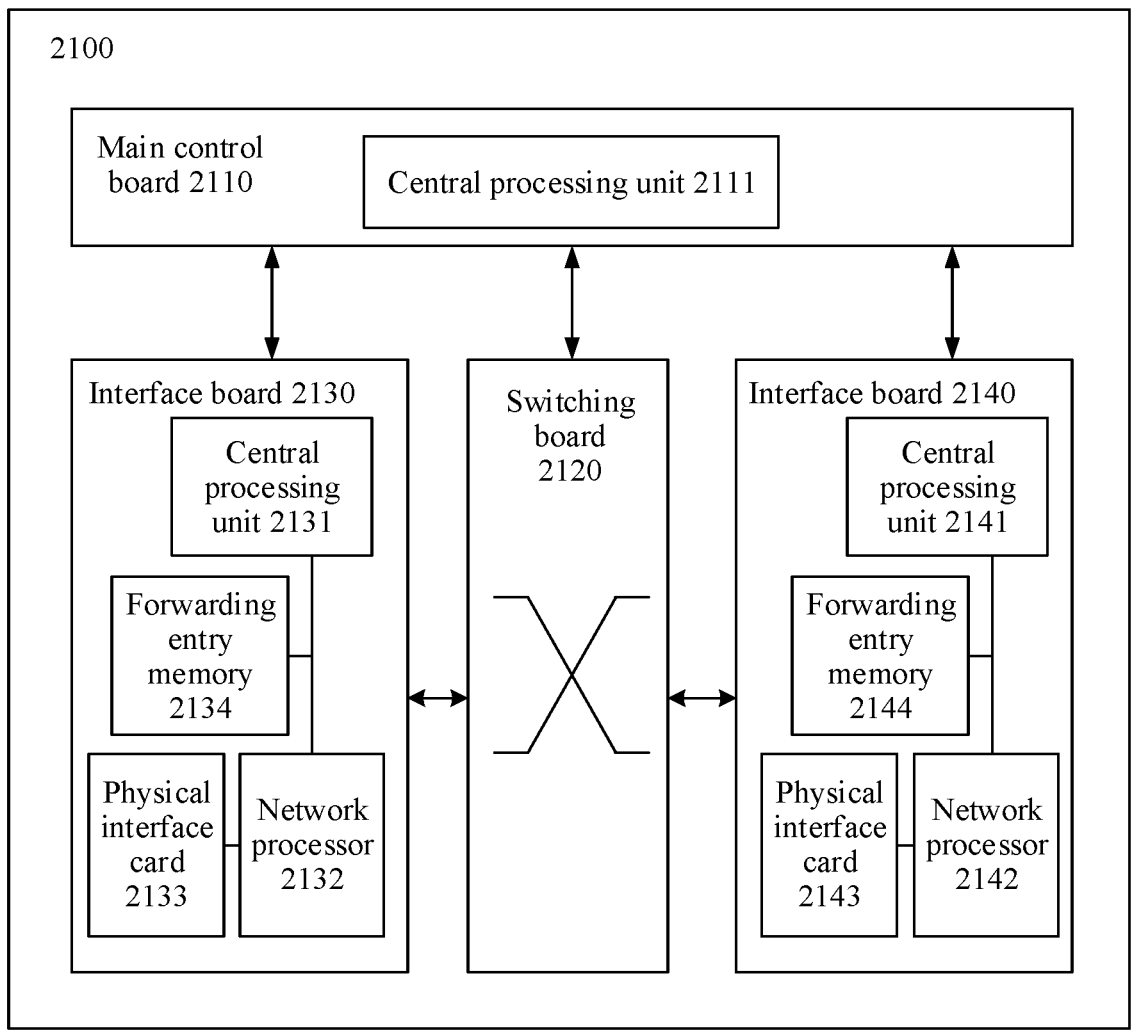
FIG. 13 is a schematic diagram of a hardware structure of another first network device 2100 according to an embodiment of this application.

FIG. 13 is a schematic diagram of a hardware structure of another first network device 2100 according to an embodiment of this application. The first network device 2100 shown in FIG. 13 may perform corresponding steps performed by the first network device in the method in the foregoing embodiments.

As shown in FIG. 13, the first network device 2100 includes a main control board 2110, an interface board 2130, a switching board 2120, and an interface board 2140. The main control board 2110, the interface boards 2130 and 2140, and the switching board 2120 are interconnected by using a system bus and a system backplane, thereby implementing interworking. The main control board 2110 is configured to implement functions such as system management, device maintenance, and protocol processing. The switching board 2120 is configured to implement data exchange between the interface boards (the interface board is also referred to as a line card or a service board). The interface boards 2130 and 2140 are configured to provide various service interfaces (for example, a POS interface, a GE interface, and an ATM interface) and implement data packet forwarding.

The interface board 2130 may include a central processing unit 2131, a forwarding entry memory 2134, a physical interface card 2133, and a network processor 2132. The central processing unit 2131 is configured to control and manage the interface board, and communicate with a central processing unit on the main control board. The forwarding entry memory 2134 is configured to store an entry, for example, the foregoing BIFT. The physical interface card 2133 is configured to receive and send traffic.

It should be understood that, in this embodiment of this application, an operation on the interface board 2140 is the same as an operation on the interface board 2130. For brevity, details are not described again. It should be understood that the first network device 2100 in this embodiment may correspond to functions provided and/or various steps implemented in the foregoing method embodiments, and details are not described herein again.

In addition, it should be noted that there may be one or more main control boards, and when there are a plurality of main control boards, the main control boards may include an active main control board and a standby main control board. There may be one or more interface boards. A stronger data processing capability of the first network device indicates a larger quantity of provided interface boards. There may also be one or more physical interface cards on the interface board. There may be no switching board or one or more switching boards. When there are a plurality of switching boards, load balancing and redundancy backup may be implemented together. In a centralized forwarding architecture, the first network device may need no switching board, and the interface board performs a function of processing service data of an entire system. In a distributed forwarding architecture, the first network device may have at least one switching board, to implement data exchange between a plurality of interface boards by using the switching board, thereby providing a large-capacity data exchange and processing capability. Therefore, a data access and processing capability of the first network device in the distributed architecture is greater than that of the device in the centralized architecture. A specific architecture that is to be used depends on a specific networking deployment scenario. This is not limited herein.

Figure 14:
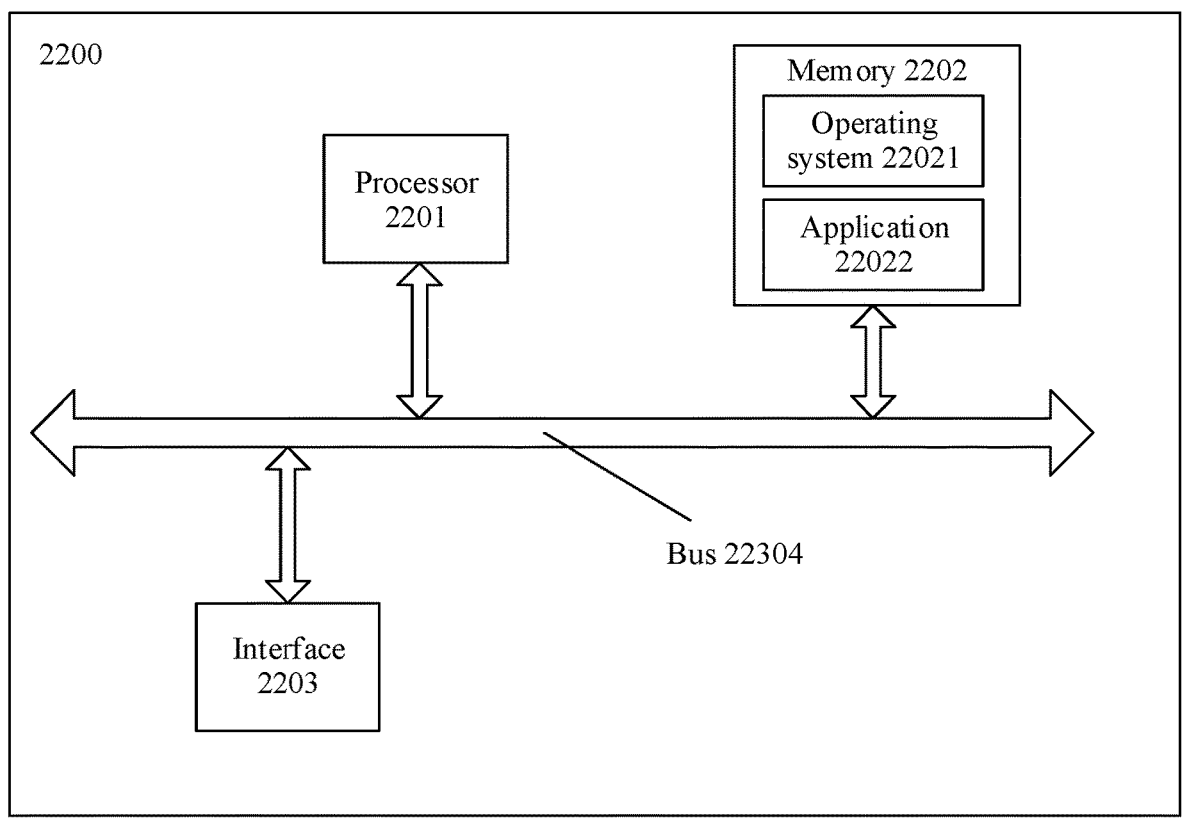
FIG. 14 is a schematic diagram of a hardware structure of a first network device 2200 according to an embodiment of this application.

FIG. 14 is a schematic diagram of a hardware structure of a second network device 2200 according to an embodiment of this application. The second network device 2200 shown in FIG. 14 may perform corresponding steps performed by the second network device in the method in the foregoing embodiments.

As shown in FIG. 14, the second network device 2200 includes a processor 2201, a memory 2202, an interface 2203, and a bus 2204. The interface 2203 may be implemented in a wireless or wired manner, and specifically, may be a network adapter. The processor 2201, the memory 2202, and the interface 2203 are connected by using the bus 2204.

The interface 2203 may specifically include a transmitter and a receiver, so that the second network device implements the foregoing sending and receiving. For example, the interface is configured to support receiving a multicast data packet. For another example, the interface 2203 is configured to support forwarding a BIER packet.

The processor 2201 is configured to perform processing performed by the second network device in the foregoing embodiments, for example, is configured to encapsulate the multicast data packet to obtain the bit index explicit replication BIER packet; and/or is used for another process of the technology described in this specification. The memory 2202 includes an operating system 22021 and an application program 22022, and is configured to store a program, code, or instructions. When the processor or a hardware device executes the program, code, or instructions, a processing process related to the second network device in the method embodiments can be implemented. Optionally, the memory 2202 may include a read-only memory (ROM) and a random access memory (RAM). The ROM includes a basic input/output system (BIOS) or an embedded system. The RAM includes the application program and the operating system. When the second network device 2200 needs to be run, the system is booted by using the BIOS fixed in the ROM or a bootloader in the embedded system, so as to boot the second network device 2200 to enter a normal running state. After the second network device 2200 enters the normal running state, the application program and the operating system in the RAM are run, thereby implementing the processing process related to the second network device 2200 in the method embodiments.

It can be understood that FIG. 14 shows only a simplified design of the second network device 2200. In actual application, the second network device may include any quantity of interfaces, processors, or memories.

Figure 15:
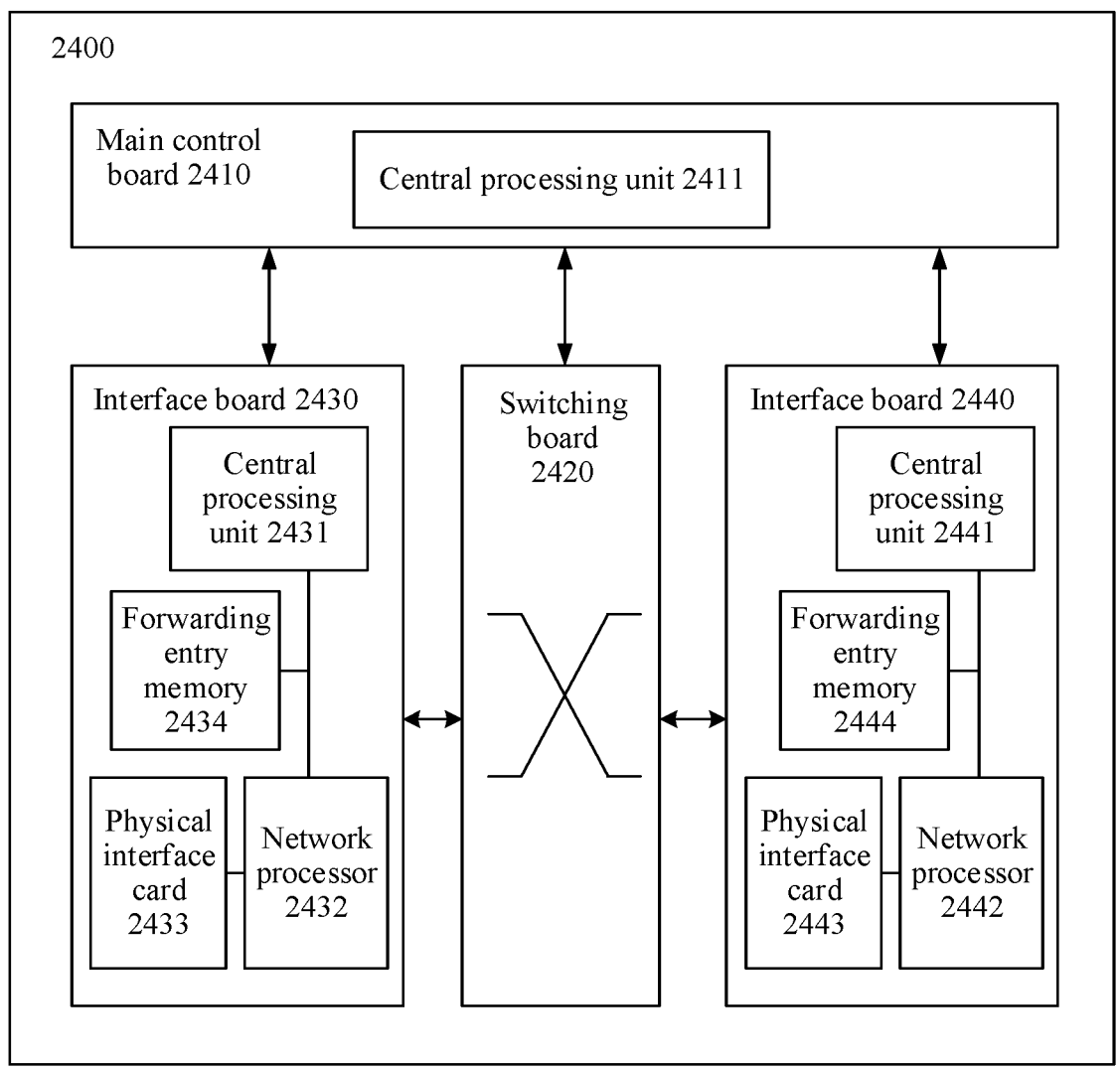
FIG. 15 is a schematic diagram of a hardware structure of another second network device 2400 according to an embodiment of this application.

FIG. 15 is a schematic diagram of a hardware structure of another second network device 2400 according to an embodiment of this application. The second network device 2400 shown in FIG. 15 may perform corresponding steps performed by the second network device in the method in the foregoing embodiments.

As shown in FIG. 15, the second network device 2400 includes a main control board 2410, an interface board 2430, a switching board 2420, and an interface board 2440. The main control board 2410, the interface boards 2430 and 2440, and the switching board 2420 are interconnected by using a system bus and a system backplane, thereby implementing interworking. The main control board 2410 is configured to implement functions such as system management, device maintenance, and protocol processing. The switching board 2420 is configured to implement data exchange between the interface boards (the interface board is also referred to as a line card or a service board). The interface boards 2430 and 2440 are configured to provide various service interfaces (for example, a POS interface, a GE interface, and an ATM interface) and implement data packet forwarding.

The interface board 2430 may include a central processing unit 2431, a forwarding entry memory 2434, a physical interface card 2433, and a network processor 2432. The central processing unit 2431 is configured to control and manage the interface board, and communicate with a central processing unit on the main control board. The forwarding entry memory 2434 is configured to store an entry, for example, the foregoing BIFT. The physical interface card 2433 is configured to receive and send traffic.

It should be understood that, in this embodiment of this application, an operation on the interface board 2440 is the same as an operation on the interface board 2430. For brevity, details are not described again. It should be understood that the second network device 2400 in this embodiment may correspond to functions provided and/or various steps implemented in the foregoing method embodiments, and details are not described herein again.

In addition, it should be noted that there may be one or more main control boards, and when there are a plurality of main control boards, the main control boards may include an active main control board and a standby main control board. There may be one or more interface boards. A stronger data processing capability of the second network device indicates a larger quantity of provided interface boards. There may also be one or more physical interface cards on the interface board. There may be no switching board or one or more switching boards. When there are a plurality of switching boards, load balancing and redundancy backup may be implemented together. In a centralized forwarding architecture, the second network device may need no switching board, and the interface board performs a function of processing service data of an entire system. In a distributed forwarding architecture, the second network device may have at least one switching board, to implement data exchange between a plurality of interface boards by using the switching board, thereby providing a large-capacity data exchange and processing capability. Therefore, a data access and processing capability of the second network device in the distributed architecture is greater than that of the device in the centralized architecture. A specific architecture that is to be used depends on a specific networking deployment scenario. This is not limited herein.

An embodiment of this application further provides a computer-readable medium. The computer-readable medium stores program code. When the computer program code is run on a computer, the computer is enabled to perform the method performed by the foregoing first network device. These computer-readable storages include but are not limited to one or more of the following: a read-only memory (ROM), a programmable ROM (PROM), an erasable PROM (EPROM), a flash memory, an electrically EPROM (EEPROM), and a hard drive.

An embodiment of this application further provides a computer-readable medium. The computer-readable medium stores program code. When the computer program code is run on a computer, the computer is enabled to perform the method performed by the foregoing second network device. These computer-readable storages include but are not limited to one or more of the following: a read-only memory (ROM), a programmable ROM (PROM), an erasable PROM (EPROM), a flash memory, an electrically EPROM (EEPROM), and a hard drive.

An embodiment of this application further provides a chip system, applied to a first network device. The chip system includes at least one processor, at least one memory, and an interface circuit. The interface circuit is responsible for information exchange between the chip system and the outside. The at least one memory, the interface circuit, and the at least one processor are interconnected by using a line. The at least one memory stores instructions. The instructions are executed by the at least one processor, so as to perform operations of the first network device in the method in the foregoing aspects.

In a specific implementation process, the chip may be implemented in a form of a central processing unit (CPU), a microcontroller (micro controller unit, MCU), a microprocessor (micro processing unit, MPU), a digital signal processor (DSP), a system on a chip (SoC), an application-specific integrated circuit (ASIC), a field programmable gate array (FPGA), or a programmable logic device (PLD).

An embodiment of this application further provides another chip system, applied to a second network device. The chip system includes at least one processor, at least one memory, and an interface circuit. The interface circuit is responsible for information exchange between the chip system and the outside. The at least one memory, the interface circuit, and the at least one processor are interconnected by using a line. The at least one memory stores instructions. The instructions are executed by the at least one processor, so as to perform operations of the second network device in the method in the foregoing aspects.

In a specific implementation process, the chip may be implemented in a form of a central processing unit (CPU), a microcontroller (micro controller unit, MCU), a microprocessor (micro processing unit, MPU), a digital signal processor (DSP), a system on a chip (SoC), an application-specific integrated circuit (ASIC), a field programmable gate array (FPGA), or a programmable logic device (PLD).

An embodiment of this application further provides a computer program product, applied to a first network device. The computer program product includes a series of instructions. When the instructions are run, operations of the first network device in the method in the foregoing aspects are performed.

An embodiment of this application further provides a computer program product, applied to a second network device. The computer program product includes a series of instructions. When the instructions are run, operations of the second network device in the method in the foregoing aspects are performed.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for detailed working processes of the foregoing system, apparatus, and unit, refer to corresponding processes in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined, or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected according to an actual requirement to achieve the objectives of the solutions in embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packet verification method, comprising:
receiving, by a first network device, a bit index explicit replication (BIER) packet, wherein packet header information of the BIER packet comprises a first keyed-hash message authentication code (HMAC) for verifying whether the BIER packet is a valid BIER packet;
determining, by the first network device, a second HMAC based on a first key and first information in the packet header information, wherein the first information indicates forwarding information of the BIER packet;
determining, by the first network device, whether the first HMAC is the same as the second HMAC; and
when the first network device determines that the first HMAC is different from the second HMAC, determining, by the first network device, that the BIER packet is an invalid BIER packet.

2. The method according to claim 1, further comprising:
when the first network device determines that the first HMAC is the same as the second HMAC, determining, by the first network device, that the BIER packet is a valid BIER packet; and
forwarding, by the first network device, the BIER packet.

3. The method according to claim 1, wherein the first information comprises at least one of a sub-domain (SD), a bit string length (BSL), or a set identifier (SI).

4. The method according to claim 1, wherein the first information comprises a bit index forwarding table identifier (BIFT-ID).

5. The method according to claim 4, wherein the determining, by the first network device, the second HMAC based on the first key and the first information in the packet header information comprises:
determining, by the first network device based on the BIFT-ID, at least one of a sub-domain (SD), a bit string length (BSL), or a set identifier (SI), the at least one of the SI, the BSL or the SI corresponding to the BIER packet; and
determining, by the first network device, the second HMAC based on the first key and the at least one of the SD, the BSL, or the SI.

6. The method according to claim 3, wherein the first information further comprises a BIER forwarding ingress router identifier (BFIR-ID).

7. The method according to claim 3, wherein the packet header information of the BIER packet comprises an internet protocol version 6 (IPv6) header, and the first information further comprises a source IPv6 address field.

8. The method according to claim 1, wherein the packet header information of the BIER packet further comprises an HMAC flag field, and a flag bit in the HMAC flag field indicates the first information used in calculation of the second HMAC.

9. The method according to claim 1, wherein the packet header information of the BIER packet further comprises an identifier (ID) of the first key.

10. The method according to claim 9, wherein the packet header information of the BIER packet further comprises an HMAC key field, and the HMAC key field comprises the ID of the first key.

11. The method according to claim 1, wherein the packet header information of the BIER packet further comprises an identifier (ID) of an algorithm, and the algorithm is an algorithm for determining the second HMAC.

12. A packet verification method, comprising:
receiving, by a second network device, a multicast data packet;
encapsulating, by the second network device, the multicast data packet to obtain a bit index explicit replication (BIER) packet, wherein the BIER packet carries a first keyed-hash message authentication code (HMAC), the first HMAC is used to verify whether the BIER packet is a valid BIER packet, the first HMAC is determined by the second network device based on a first key and first information in packet header information of the BIER packet, the first information indicates forwarding information of the BIER packet; and
forwarding, by the second network device, the BIER packet.

13. The method according to claim 12, wherein the first information comprises at least one of a sub-domain (SD), a bit string length (BSL), or a set identifier (SI).

14. The method according to claim 12, wherein the first information comprises a bit index forwarding table identifier (BIFT-ID).

15. The method according to claim 14, wherein that the first HMAC is determined by the second network device based on the first key and the first information in the packet header information of the BIER packet comprises:
determining, by the second network device based on the BIFT-ID, at least one of a sub-domain (SD), a bit string length (BSL), or a set identifier (SI), the at least one of the SI, the BSL or the SI corresponding to the BIER packet; and
determining, by the second network device, the first HMAC based on the first key and the at least one of the SD, the BSL, or the SI.

16. The method according to claim 13, wherein the first information further comprises a BIER forwarding ingress router identifier (BFIR ID).

17. The method according to claim 13, wherein the packet header information of the BIER packet comprises an internet protocol version 6 (IPv6) header, and the first information further comprises a source IPv6 address field.

18. The method according to claim 12, wherein the packet header information of the BIER packet further comprises an identifier (ID) of an algorithm, and the algorithm is an algorithm for determining the first HMAC.

19. A network device, comprising:
a non-transitory memory storing instructions; and
a processor coupled to the non-transitory memory; wherein the instructions, when executed by the processor, cause the network device to:
receive a bit index explicit replication (BIER) packet, wherein packet header information of the BIER packet comprises a first keyed-hash message authentication code (HMAC), and the first HMAC is used to verify whether the BIER packet is a valid BIER packet; and determine a second HMAC based on a first key and first information in the packet header information, wherein the first information indicates forwarding information of the BIER packet, determine whether the first HMAC is the same as the second HMAC; and when determining that the first HMAC is different from the second HMAC, determine that the BIER packet is an invalid BIER packet.

20. The network device according to claim 19, wherein the instructions, when executed by the processor, further cause the network device to:

when determining that the first HMAC is the same as the second HMAC, determine that the BIER packet is a valid BIER packet; and forward the BIER packet.

21. The network device according to claim 19, wherein the first information comprises at least one of a sub-domain (SD), a bit string length (BSL), or a set identifier (SI).

22. The network device according to claim 19, wherein the first information comprises a bit index forwarding table identifier (BIFT-ID).

23. The network device according to claim 22, wherein the instructions, when executed by the processor, further cause the network device to be configured to:

determine, based on the BIFT-ID, at least one of a sub-domain (SD), a bit string length (BSL), or a set identifier (SI), the at least one of the SI, the BSL or the SI corresponding to the BIER packet; and determine the second HMAC based on the first key and the at least one of the SD, the BSL, or the SI.

24. The network device according to claim 21, wherein the first information further comprises a BIER forwarding ingress router identifier (BFIR-ID).

25. The network device according to claim 21, wherein the packet header information of the BIER packet comprises an internet protocol version 6 (IPv6) header, and the first information further comprises a source IPv6 address field.

26. A network device, comprising:

a non-transitory memory storing instructions; and a processor coupled to the non-transitory memory; wherein the instructions, when executed by the processor, cause the network device to:

receive a multicast data packet;

encapsulate the multicast data packet to obtain a bit index explicit replication (BIER) packet, wherein the BIER packet carries a first keyed-hash message authentication code (HMAC), the first HMAC is used to verify whether the BIER packet is a valid BIER packet, the first HMAC is determined by the second network device based on a first key and first information in packet header information of the BIER packet, the first information indicates forwarding information of the BIER packet; and forward the BIER packet.

27. The network device according to claim 26, wherein the first information comprises at least one of a sub-domain (SD), a bit string length (BSL), or a set identifier (SI).

28. The network device according to claim 26, wherein the first information comprises a bit index forwarding table identifier (BIFT-ID).

29. The network device according to claim 28, wherein the instructions, when executed by the processor, further cause the network device to be configured to:

determine, based on the BIFT-ID, at least one of a sub-domain (SD), a bit string length (BSL), or a set identifier (SI), the at least one of the SI, the BSL or the SI corresponding to the BIER packet; and determine the first HMAC based on the first key and the at least one of the SD, the BSL, or the SI.

30. The network device according to claim 27, wherein the first information further comprises a BIER forwarding ingress router identifier (BFIR ID).

* * * * *